United States Patent [19]

Yamamura et al.

[11] Patent Number: 5,541,018
[45] Date of Patent: Jul. 30, 1996

[54] HYDROGEN STORING ALLOY ELECTRODE

[75] Inventors: Yasuharu Yamamura, Katano; Hajime Seri, Izumiotsu; Yoichiro Tsuji, Hirakata; Tsutomu Iwaki, Yawata, all of Japan

[73] Assignee: Matsushita Electric Industrial Co., Ltd., Osaka, Japan

[21] Appl. No.: 384,809

[22] Filed: Feb. 6, 1995

Related U.S. Application Data

[63] Continuation of Ser. No. 45,608, Apr. 9, 1993, abandoned.

[30] Foreign Application Priority Data

| Apr. 13, 1992 | [JP] | Japan | 4-92532 |
| May 29, 1992 | [JP] | Japan | 4-138300 |
| Jun. 3, 1992 | [JP] | Japan | 4-142339 |
| Jun. 3, 1992 | [JP] | Japan | 4-142340 |
| Jun. 4, 1992 | [JP] | Japan | 4-143978 |
| Jun. 4, 1992 | [JP] | Japan | 4-143979 |
| Sep. 14, 1992 | [JP] | Japan | 4-244531 |
| Oct. 20, 1992 | [JP] | Japan | 4-281900 |

[51] Int. Cl.$^6$ ............................................. H01M 4/38
[52] U.S. Cl. ................ 429/59; 429/223; 429/224; 420/900
[58] Field of Search ................. 420/900; 429/59, 429/223, 224

[56] References Cited

U.S. PATENT DOCUMENTS

| 4,551,400 | 11/1985 | Sapru et al. | 429/94 |
| 4,623,597 | 11/1986 | Sapru et al. | 429/101 |
| 4,637,967 | 1/1987 | Keem et al. | 429/101 |
| 4,728,586 | 3/1988 | Venkatesan et al. | 429/94 |
| 4,849,205 | 7/1989 | Hong | 423/644 |
| 4,946,646 | 8/1990 | Gamo et al. | 423/644 X |

FOREIGN PATENT DOCUMENTS

| 0293660 | 12/1988 | European Pat. Off. . |
| 0413029 | 2/1991 | European Pat. Off. . |
| 0450590 | 10/1991 | European Pat. Off. . |
| 0504950 | 9/1992 | European Pat. Off. . |
| 64-60961 | 3/1989 | Japan . |
| 1102855 | 4/1989 | Japan . |
| 4301045 | 10/1992 | Japan . |
| 582125 | 4/1993 | Japan . |

OTHER PUBLICATIONS

European Search Report for Appl. 93105939.8, mailed Jun. 29, 1993.

*Primary Examiner*—John S. Maples
*Attorney, Agent, or Firm*—Renner, Otto, Boisselle & Sklar

[57] ABSTRACT

The present invention provides a hydrogen storing alloy electrode having a large discharging capacity and a long lifetime at a high temperature. The electrode is also excellent in discharging characteristics in the early charging and discharging cycles. In one aspect of the present invention, the hydrogen storing alloy electrode is made of a hydrogen storing alloy represented by the general formula $ZrMn_m$-$V_xX_yNi_z$ or a hydride thereof, wherein X is Al, Zn or W; m, x, y, and z are respectively mole ratio of Mn, V, X, and Ni to Zr: $0.4 \leq m \leq 0.8$, $0.1 \leq x \leq 0.3$, $1.0 \leq z \leq 1.5$, and $2.0 \leq m+x+y+z \leq 2.4$; when X is Al or Zn, $0 < y \leq 0.2$; and when X is W, $0 < y \leq 0.1$. The alloy has mainly C15-type Laves phases with a crystal structure of $MgCu_2$ type face center cubix. The alloy has a crystal lattice constant α 7.03 angstroms or more and 7.10 angstroms or less.

4 Claims, 17 Drawing Sheets

HYDROGEN STORING ALLOY ELECTRODE

This is a continuation of application Ser. No. 08/045,608 filed on Apr. 9, 1993, now abandoned.

BACKGROUND OF THE INVENTION

1. Field of the Invention

The present invention relates to a hydrogen storing alloy electrode which can electrochemically absorb and desorb hydrogen in a reversible manner.

2. Description of the Related Art

Storage batteries, which are widely used as a variety of power sources, have two general classifications: lead storage batteries and alkaline storage batteries. Compared with lead storage batteries, alkaline storage batteries have higher reliability and can be made smaller in size, so that they are used in various kinds of portable electric devices. On the other hand, large-sized alkaline storage batteries are widely used for industrial equipment. The positive electrodes of alkaline storage batteries have previously been of a pocket type, but at present, those of a sintered type are generally used. This change in the configuration of the positive electrodes has improved the characteristics of the alkaline storage batteries. Furthermore, it has become possible to hermetically seal the batteries, so that the alkaline storage batteries have come to find wider application.

Some alkaline storage batteries use, for example, air or silver oxide for their positive electrodes. But in most cases, the positive electrodes are made of nickel.

As the negative electrodes of alkaline storage batteries, cadmium electrodes are now generally used. Other materials for the negative electrodes include zinc, iron, hydrogen, and the like.

The cadmium electrodes, however, have a small theoretical energy capacity. Zinc electrodes also have disadvantages in that they are susceptible to deformation and that dandrites tend to be formed on the electrodes.

In order to attain a larger theoretical energy capacity, an electrode made of a hydrogen storing alloy or a hydride thereof has been developed to be used in a nickel-hydrogen storage battery. Many methods for the production of such a nickel-hydrogen storage battery have been proposed.

A hydrogen storing alloy can absorb and desorb hydrogen through a reversible electrochemical reaction. When the negative electrode of an alkaline storage battery is made of this hydrogen storing alloy, it attains a larger theoretical energy capacity, as compared with the cadmium electrodes. Furthermore, unlike the zinc electrodes, when using the hydrogen storing alloy electrode, neither deformation of the electrode nor dendrite-growth on the electrode occurs. Therefore, it is expected that hydrogen storing alloys will provide electrodes having a large theoretical energy capacity and a longer lifetime with no possibility of causing pollution.

Examples of well known hydrogen storing alloys to be used for electrodes include multi-element alloys such as Ti—Ni type alloys, La(or Mm)—Ni type alloys (wherein Mm is a misch metal), and the like.

The Ti—Ni type alloys are of an AB type (wherein A is an element with a strong affinity for hydrogen such as La, Zr and Ti, and B is a transition element such as Ni, Mn and Cr). When such a Ti—Ni type alloy is used for the negative electrode of an alkaline storage battery, the electrode exhibits relatively large discharging capacities in the early charging and discharging cycles. With the repetition of charging and discharging, however, it becomes difficult to keep the discharging capacity from decreasing.

The multi-element alloys of the La(or Mm)—Ni type are known as $AB_5$ type multi-element alloys. Many attempts have recently been made to develop alloys of this type because they have been considered as suitable materials for electrodes. Moreover, an electrode using this type of alloy has problems of a relatively small discharging capacity and a short lifetime. Furthermore, materials for this type of alloys are expensive.

Another hydrogen storing alloy is a Laves phase alloy of an $AB_2$ type. The Laves phase alloys have a large capacity for absorbing hydrogen, and electrodes using these alloys have a large energy capacity and a long lifetime. As examples of the Laves phase alloys, there are a $Zr_\alpha V_\beta Ni_\gamma M_\delta$ type alloy (Japanese Laid-Open Patent Publication No. 64-60961), an $A_x B_y Ni_z$ type alloy (wherein A is Zr alone or including 30 atomic % of Ti and Hf, and B is at least one element selected from the group consisting of transition metal elements such as Nb, Cr, Mo, Mn, Fe, Co, Ca, Al, La and Ce) (Japanese Laid-open Patent Publication No. 1-102855), and the like. Further, alloys having improved discharging characteristics in the early charging and discharging cycles (hereinafter referred to as the "early discharging characteristics") are known (Japanese Patent Application Nos. 3-66354, 3-66355, 3-66358 and 3-66359).

Electrodes using the above-mention conventional Laves phase alloys of the $AB_2$ type have a long lifetime and a large discharging capacity, as compared with electrodes using the multi-element alloys of the AB type such as the Ti—Ni type alloys and the $AB_5$ type such as the La(or Mn)—Ni type alloys. However, the conventional Laves phase alloy electrodes have poor early discharging characteristics.

The present inventors have improved the early discharging characteristics, while maintaining a large discharging capacity, by using a Zr—Mn—V—M—Ni type alloy (wherein M is at least one element selected from the group consisting of Fe and Co) (Japanese Patent Application No. 4-70704). However, in an enclosed alkaline battery with an electrode using this type of alloy, a large amount of the alloy composition elutes into the alkaline electrolytic solution at high temperatures and the eluted metal element will be precipitated as a conductive oxide. As a result, a short circuit is caused and the battery voltage is rapidly decreased when the battery is kept at 65° C.

Thus, there has been a great demand for a hydrogen storing alloy electrode having a large discharging capacity, excellent early discharging characteristics, and a long lifetime at a high temperature, by further improving the characteristics of the hydrogen storing alloys.

SUMMARY OF THE INVENTION

The hydrogen storing alloy electrode according to the present invention comprises a hydrogen storing alloy represented by the general formula $ZrMn_m V_x X_y Ni_z$ or a hydride thereof. The hydrogen storing alloy has mainly C15-type Laves phases with a crystal structure of $MgCu_2$ type face center cubix, and the crystal lattice constant thereof is 7.03 angstroms or more and 7.10 angstroms or less. In the above formula, X is Al, Zn or W; m, x, y and z are respectively the mole ratios of Mn, V, X and Ni to Zr; $0.4 \leq m \leq 0.8$, $0.1 \leq x \leq 0.3$, $1.0 \leq z \leq 1.5$ and $2.0 \leq m+x+y+z \leq 2.4$; when X is Al or Zn, $0 < y \leq 0.2$; and when X is W, $0 \leq y \leq 0.1$.

Alternatively, the hydrogen storing alloy electrode according to the present invention comprises a hydrogen storing alloy represented by the general formula $ZrMn_m$-$V_xZ_tX_uNi_z$ or a hydride thereof. The hydrogen storing alloy has mainly C15-type Laves phases with a crystal structure of $MgCu_2$ type face center cubix, and a crystal lattice constant thereof is 7.03 angstroms or more and 7.10 angstroms or less. In the above formula, X is Al, Zn or W; Z is at least one element selected from the group consisting of Fe, Co and Cr; m, x, t, u and z are respectively the mole ratios of Mn, V, Z, X and Ni to Zr; $0.4 \leq m \leq 0.8$, $0.1 \leq x \leq 0.3$, $0.1 \leq t \leq 0.2$, $1.0 \leq z \leq 1.5$, $2.0 \leq m+x+t+u+z \leq 2.4$; when X is Al, $0 < u \leq 0.2$; when X is W, $0 < u \leq 0.1$; and when X is Zn, $0.02 \leq u \leq 0.18$.

Alternatively, the hydrogen storing alloy electrode according to the present invention comprises a hydrogen storing alloy represented by the general formula $ZrMn_m$-$V_xM_rCr_wNi_z$ or a hydride thereof. The hydrogen storing alloy has mainly C15-type Laves phases with a crystal structure of $MgCu_2$ type face center cubix, and a crystal lattice constant thereof is 7.03 angstroms or more and 7.10 angstroms or less. In the above formula, M is at least one element selected from the group consisting of Fe and Co; m, x, r, w and z are respectively the mole ratios of Mn, V, M, Cr and Ni to Zr; $0.4 \leq m \leq 0.8$, $0.1 \leq x \leq 0.3$, $0.1 \leq r \leq 0.2$, $0.02 \leq w \leq 0.08$, $1.0 \leq z \leq 1.5$, and $2.0 \leq m+x+r+w+z \leq 2.4$ In one embodiment, the hydrogen storing alloy is heat-treated at a temperature of 900° to 1,300° C. in a vacuum or in an inert-gaseous atmosphere.

Thus, the invention described herein makes possible the objectives of (1) providing a hydrogen storing alloy electrode with a large discharging capacity which can electrochemically absorb and desorb a large amount of hydrogen with high efficiency from the early charging and discharging cycles; and (2) providing a hydrogen storing alloy electrode in which an alloy composition can be prevented from eluting into an alkaline electrolytic solution; (3) providing a hydrogen storing alloy electrode having a long lifetime at a high temperature; and (4) providing a hydrogen absorbing alloy electrode suitable for an alkaline storage battery, for example, a nickel-hydrogen storage battery; the battery maintaining a large discharge capacity and early excellent discharging characteristics as compared with the conventional storage batteries.

DESCRIPTION OF THE PREFERRED EMBODIMENTS

Figure 1:
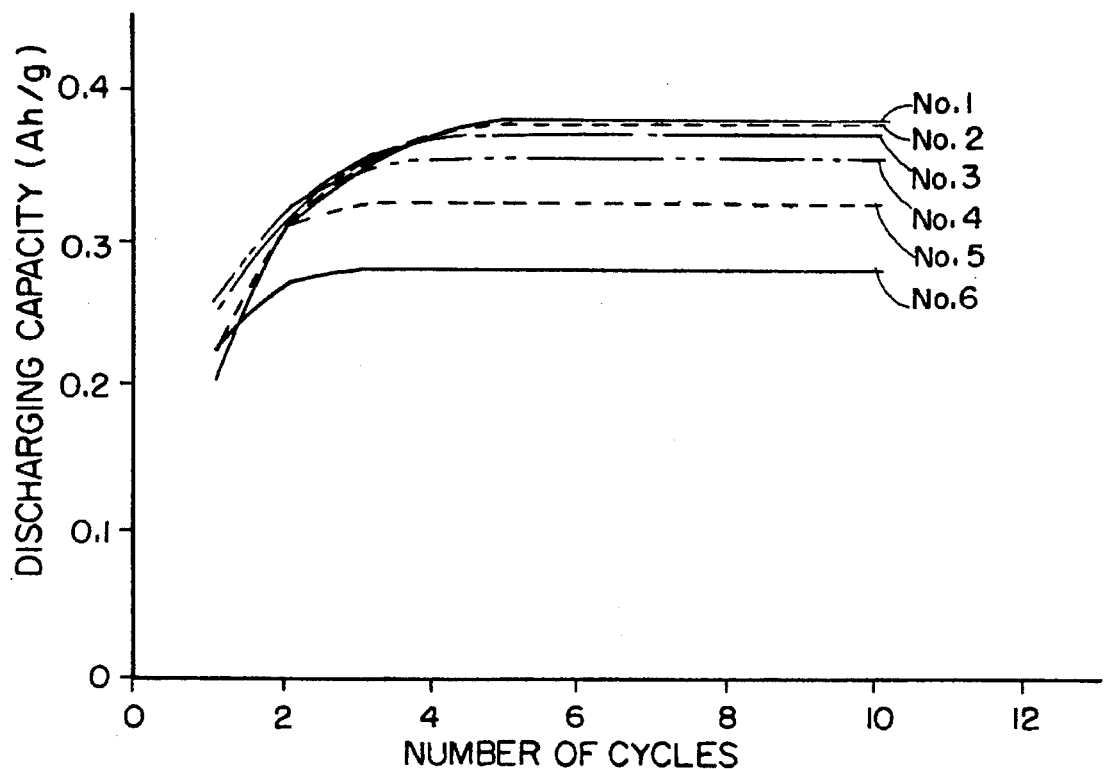
FIG. 1 shows the test results for a half cell produced by using a hydrogen storing alloy produced in Example 1 of the present invention.

Electrodes of the present invention are made of hydrogen storing alloys of several types. Each of the electrodes will now be described.

A first hydrogen storing alloy electrode of the present invention utilizes a hydrogen storing alloy represented by the formula $ZrMn_mV_xX_yNi_z$ or hydrides thereof, wherein X is Al, Zn or W; and m, x, y and z are respectively the mole ratios of Mn, V, X and Ni to Zr. The mole ratios describes below are especially determined so that the absorption and desorption of a large amount of hydrogen can be accomplished. The hydride herein means a hydrogen storing alloy in which hydrogen is absorbed.

The range of m, that is, the mole ratio of Mn to Zr, is preferably $0.4 \leq m \leq 0.8$, more preferably $0.5 \leq m \leq 0.7$. The content of Mn in a hydrogen storing alloy influences the hydrogen equilibrium pressure for the alloy. The hydrogen equilibrium pressure can be shown in a P (hydrogen equilibrium pressure)—C (composition)—T (temperature) measurement curve, i.e., a pressure-composition isotherm diagram (hereinafter referred to as the "PCT diagram") obtained from the measurement of the amount of hydrogen absorbed in the alloy under a hydrogen atmosphere. At the pressure corresponding to a substantially horizontal portion of the PCT diagram (hereinafter referred to as the "plateau region"), a large amount of hydrogen is absorbed by or desorbed from the alloy. A longer plateau region indicates a larger amount of hydrogen absorption. When m is smaller than 0.4, the PCT diagram disadvantageously has a short plateau region. When m exceeds 0.4, it has a longer plateau region, resulting in increasing discharging capacity of the electrode. However, when m exceeds 0.8, a large amount of Mn elutes into the electrolytic solution, resulting in a shortened lifetime for the electrode.

The range of x, that is, the mole ratio of V to Zr, is preferably $0.1 \leq x \leq 0.3$. V contributes to an increase in the amount of hydrogen to be absorbed by or desorbed from the alloy. When x is less than 0.1, V does not exhibit its own effect. When x is more than 0.3, the homogeneity of the alloy disadvantageously deteriorates, thereby decreasing the amount of hydrogen to be absorbed or desorbed.

The range of z, that is, the mole ratio of Ni to Zr, is preferably $1.0 \leq z \leq 1.5$, more preferably $1.1 \leq x \leq 1.4$. Ni causes a decrease in the amount of hydrogen absorption. However, it contributes to an improvement in the electrochemical activity of the alloy against hydrogen absorption or desorption. When z is less than 1.0, the electrochemical activity is low, resulting in decreasing the discharging capacity. When z is more than 1.5, the hydrogen equilibrium pressure is increased, resulting in disadvantageously decreasing the amount of hydrogen absorption or desorption.

X is Al, Zn or W. Al and Zn have a function to protect the alloy compositions from dissolving into an alkaline solution, while W has a function to increase corrosion resistance of the alloy. The alloy compositions are prevented from eluting into the alkaline electrolytic solution because of these components.

When X is Al, i.e., in an electrode made of the hydrogen storing alloy represented by the formula $ZrMn_mV_xAl_yNi_z$, the range of y, that is, the mole ratio of Al to Zr is preferably $0<y \leq 0.2$, more preferably $0.06 \leq y \leq 0.15$. When y exceeds 0.2, the amount of hydrogen absorption is disadvantageously decreased largely.

When X is Zn, i.e., in an electrode made of the hydrogen storing alloy represented by the formula $ZrMn_mV_xZn_yNi_z$, the range of y, that is, the mole ratio of Zn to Zr is preferably $0<y \leq 0.2$, more preferably $0.05 \leq y \leq 0.15$. Zn, similarly to Ni, causes a decrease in the amount of hydrogen absorption and desorption, but contributes to an improvement in the electrochemical activity of the alloy for the hydrogen absorption and desorption. When y exceeds 0.2, the amount of hydrogen absorption is disadvantageously decreased largely.

When X is W, i.e., in an electrode made of the hydrogen storing alloy represented by the formula $ZrMn_mV_xW_yNi_z$, the range of y, that is, the mole ratio of W to Zr is preferably $0<y \leq 0.1$, more preferably $0.5 \leq y \leq 0.1$. W also has a function to degrade the electrochemical activity of the alloy in the early charging and discharging cycles. Therefore, when y exceeds 0.1, the early discharging characteristics disadvantageously deteriorate.

A second hydrogen storing alloy electrode of the present invention utilizes a hydrogen storing alloy represented by the formula $ZrMn_mV_xZ_tX_uNi_z$ or the hydrides thereof, wherein X is Al, W or Zn; Z is at least one element selected from the group consisting of Fe, Co and Cr; and m, x, t, u and z are respectively the mole ratios of Mn, V, Z, X and Ni to Zr. The mole ratios described later are especially determined so that the absorption and desorption of a large amount of hydrogen can be accomplished.

Among these components of the second hydrogen storing alloy, the contents and the functions of Mn, V and Ni are identical to those described with respect to the first hydrogen storing alloy electrode. This electrode further comprises Fe, Co and/or Cr, all of which are represented by Z.

X is Al, Zn or W. Al and Zn have a function to protect the alloy compositions from dissolving into an alkaline solution, while W has a function to increase corrosion resistance of the alloy. The alloy compositions are prevented from eluting into the alkaline electrolytic solution because of these components.

When X is Al, i.e., in an electrode made of the hydrogen storing alloy represented by the formula $ZrMn_mV_xAl_uNi_z$, the range of u, that is, the mole ratio of Al to Zr is preferably $0<u \leq 0.2$, more preferably $0.06 \leq u < 0.15$. When u exceeds 0.2, the amount of hydrogen absorption is disadvantageously decreased largely.

When X is Zn, i.e., in an electrode made of the hydrogen storing alloy represented by the formula $ZrMn_mV_xZn_uNi_z$, the range of u, that is, the mole ratio of Zn to Zr is preferably $0.02 \leq u \leq 0.18$. Zn, similarly to Ni, causes a decrease in the amount of hydrogen absorption and desorption, but contributes to an improvement in the electrochemical activity of the alloy for the hydrogen absorption and desorption. When u exceeds 0.18, the amount of hydrogen absorption is disadvantageously decreased largely.

When X is W, i.e., in an electrode made of the hydrogen storing alloy represented by the formula $ZrMn_mV_xW_uNi_z$, the range of u, that is, the mole ratio of W to Zr is preferably $0<u \leq 0.1$, preferably $0.5 \leq u \leq 0.1$. W also has a function to degrade the electrochemical activity of the alloy in the early charging and discharging cycles. Therefore, when u exceeds 0.1, the early discharging characteristics disadvantageously deteriorate.

Z is at least one element selected from the group consisting of Fe, Co, and Cr. The range of t, that is, the mole ratio of Z to Zr, is preferably $0.1 \leq t \leq 0.2$. Z contributes to an improvement in the electrochemical activity of the alloy for hydrogen absorption and desorption. When t is less than 0.1, Z does not exhibit its own effect to improve the electrochemical activity, particularly the activity in the early charging and discharging cycles. When t exceeds 0.2, the amount of hydrogen absorption and desorption is disadvantageously decreased.

A third hydrogen storing alloy electrode of the present invention utilizes a hydrogen storing alloy represented by the formula $ZrMn_mV_xM_rCr_wNi_z$ or hydrides thereof, wherein M is at least one element selected from the group consisting of Fe and Co; and m, x, r, w and z are respectively the mole ratios of Mn, V, M, Cr and Ni or Zr. The mole ratios described later are especially determined so that the absorption and desorption of a large amount of hydrogen can be accomplished.

Among these compositions of the third hydrogen storing alloy, the contents and the functions of Mn, V, and Ni are identical to those described with respect to the first hydrogen storing alloy electrode. This electrode further comprises Fe and/or Co, which are represented by M, and Cr. The functions of Fe and/or Co are identical to those described with respect to the elements represented by Z in the second hydrogen storing alloy electrode.

The range of w, that is, the mole ratio of Cr to Zr, is preferably $0.02 \leq w \leq 0.08$. The alloy components are prevented from eluting into the alkaline electrolytic solution by the addition of Cr. When w is less than 0.02, the content of Cr is too small to prevent the elution of the alloy components into the electrolytic solution. When w exceeds 0.08, the early discharging characteristics disadvantageously deteriorate. This is because Cr also has a function to degrade the discharging characteristics of the alloy in the early charging and discharging cycles.

In the hydrogen storing alloy electrodes according to the present invention which is made of the above-mentioned specific alloy, the alloy components, especially Mn and V, are prevented from eluting into the alkaline electrolytic solution. In addition, as for the electrochemical charging and discharging characteristics, a large amount of hydrogen can be effectively absorbed by or desorbed from the alloy from the early charging and discharging cycles.

The above-mentioned alloys used in the present invention mainly have C15-type Laves phases with a sufficient hydrogen absorbing capacity. The following conditions must be satisfied in such an alloy: $2.0 \leq m+x+y+z \leq 2.4$ in the firs electrode; $2.0 \leq m+x+t+u+z \leq 2.4$ in the second electrode; and $2.0 \leq m+x+r°w+z \leq 2.4$ in the third electrode.

Such alloys for fabricating the electrode according to the present invention are obtained in the following manner: The respective metals are melted in the ratio to form the alloy with the application of heat, for example, in an inert-gaseous atmosphere such as an atmosphere of argon by using an arc melting furnace, thereby obtaining the C15-type Laves phase alloy. The alloy thus obtained is heat-treated at 900° to 1300° C. in a vacuum or in the atmosphere of an inert gas, thereby increasing the proportion of C15-type Laves phases to the whole alloy as compared with the alloy before the heat treatment. This improves the homogeneity and crystallinity of the alloy, so that the resultant alloy has a large hydrogen absorbing capacity to provide an electrode which exhibits excellent early discharging characteristics.

The range of the crystal lattice constant α of the hydrogen storing alloy used in the present invention is preferably $7.03 \leq \alpha \leq 7.10$ angstroms.

The alloy obtained in the above-described manner can be used as an electrode without or after cutting into a desired shape. The secondary cell is produced by using the resulting alloy as a negative electrode and nickel as a positive electrode. The hydrogen storing alloy electrode can be used as an electrode in an alkaline storage battery.

EXAMPLES

The invention will be further described by reference to the following examples.

(Example 1)

Commercially available Zr, Mn, V, Al, and Ni were used as starting materials, and were melted in an atmosphere of argon by using an arc melting furnace to produce alloys represented by the formula $ZrMn_{0.6}V_{0.2}Al_yNi_{1.3}$, wherein $0 \leq y \leq 0.4$, with different compositions as listed in Table 1 below. Then, a heat treatment was conducted at 1100° C. for 12 hours in a vacuum to obtain sample alloys.

Samples 2 to 4 are examples of the hydrogen storing alloy applicable to the present invention. Sample 1 is a reference example including no Al (i.e., y, the mole ratio of Al=0) and Samples 5 and 6 are reference examples including a larger amount of Al (i.e., y=0.3 in Sample 5 and y=0.4 in Sample 6).

Part of each sample was used for evaluation of physicochemical characteristics of the obtained alloy, and the remaining part was used for the evaluation of electrochemical characteristics thereof.

1. Evaluation of Physicochemical Characteristics of Hydrogen Storing Alloy

The physicochemical characteristics of the hydrogen storing alloys obtained above were evaluated by an X-ray powder diffraction and measurement of the amount of hydrogen to be absorbed by or desorbed from the alloy in an atmosphere of hydrogen.

The results of the X-ray powder diffraction proved that the phases of each alloy sample were mainly C15-type Laves phases having a crystal structure of $MgCu_2$ type face center cubix (fcc). X-ray diffraction was also performed before the heat treatment. As a result, it was found that the peaks representing fcc structures (C15-type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. The crystal lattice constants of the alloy samples decreased as y, the mole ratio of Al, increased, but were within the range of 7.04 to 7.10 angstroms in all samples.

Next, characteristics of hydrogen absorption or desorption of a hydrogen storing alloy (hereinafter referred to as the "PCT characteristics") were determined at 70° C. to find the hydrogenation characteristics, i.e., the hydrogen absorbing characteristics, were almost the same in all samples. However, the amount of hydrogen absorption was largely decreased in Samples 5 and 6 having y, the mole ratio of Al, of more than 0.2. Moreover, a heat treatment in vacuum made the plateau region in the PCT diagram longer, resulting in increasing the amount of hydrogen to be absorbed by or desorbed from the alloy.

2. A Half Cell Test

Each of the above-mention alloy samples was made into a half cell to determine the characteristics of the discharging capacity thereof. The half cell was produced by pressure molding a mixture of powder of each hydrogen storing alloy and Ni powder into the shape of a disc as follows:

First, each of Samples 1 to 6 was ground to 350 mesh or finer. To 1 g of each resultant alloy powder, 3 g of nickel carbonyl powder and 0.12 g of polyethylene fine powder were added as a conductive material and a binder, respectively. The whole was thoroughly stirred and mixed. The mixture thus obtained was then formed with the application of pressure into a disk of 24.5 mm in diameter and 2.5 mm in thickness. The disk was heated at 130° C. in a vacuum for 1 hour, so that the binder was melted therein, resulting in a hydrogen storing alloy electrode.

A nickel lead wire was attached to the hydrogen storing alloy electrode, i.e., a negative electrode. As a positive electrode, a sintered nickel electrode with excessive capacity was used. The thus prepared negative and positive electrodes were placed, with a separator therebetween, in an electrolytic solution, thereby constituting an open-type cell with an excessive electrolytic solution to be used for the half cell test. The capacity of the cell thus produced was limited by that of its negative electrode. As the separator, a polyamide nonwoven fabric was used. The electrolytic solution was an aqueous potassium hydroxide solution with a specific gravity of 1.30.

Using the open-type cell thus obtained for each sample, charging and discharging were repeated at a constant current at a temperature of 25° C. The discharging capacity of the cell was measured in each of the charging and discharging cycles. In charging, a current of 100 mA was supplied for 5.5 hours for every 1 g of the hydrogen storing alloy. Discharging was performed at the current of 50 mA also for every 1 g of the hydrogen storing alloy and continued until the cell voltage decreased to 0.8 V. The results are shown in FIG. 1.

In FIG. 1, the abscissa indicates the number of charging and discharging cycles, while the ordinate indicates the discharging capacity (Ah/g) obtained for every 1 g of the hydrogen storing alloy. The numerals indicating the respective plots correspond to the samples Nos. listed in Table 1. (Hereinafter, all the numerals indicating the plots in each figure correspond to the sample Nos. listed in the corresponding tables.)

As can be seen from FIG. 1, the saturation discharging capacity of a cell is decreased as y, the mole ratio of Al, is increased. As for the discharging capacity in the first cycle, however, Samples 2 to 6 including Al exhibited a larger value than Sample 1 including no Al. This shows that an alloy including Al has excellent early discharging characteristics as calculated by dividing the discharging capacity in the first cycle by the saturation discharging capacity.

3. A Shelf Life Test of Enclosed-type Nickel-Hydrogen Storage Batteries

Samples 1 to 6 obtained in the above manner were used to produced enclosed-type nickel-hydrogen storage batteries for the evaluation of the lifetime characteristics thereof at 65° C.

First, each of the alloys was ground to 350 mesh or finer, and the resultant powder was mixed with a dilute aqueous solution including about 5 to 10 wt % of carboxymethylcellulose (CMC) based on the alloy powder. The mixture was stirred until it took the form of a paste. Next, the paste-like electrode material thus obtained was applied to an electrode support of a foamed nickel sheet having a thickness of 1.0 mm and a porosity of 95% with a mean pore size of 150 μm. The porous nickel sheet filled with the paste-like electrode material was dried at 130° C. and pressed by the use of a pressure roller, and then coated with fluorocarbon resin powder. Thereafter, the whole was cut into an individual electrode each having a width of 3.3 cm, a length of 21 cm and a thickness of 0.40 mm.

Using each hydrogen storing alloy electrode thus produced, an enclosed-type nickel-hydrogen battery was produced as follows: First, two plates serving as loads were attached to the hydrogen storing alloy electrode at predetermined positions so that the electrode was used as a negative electrode. Next, the thus prepared negative electrode was rolled up together with a positive electrode and a separator, with a separator being disposed between the two electrodes, resulting in a cylindrical roll of electrodes. The cylindrical electrode roll thus obtained was placed in a vessel of an SC size, and an electrolytic solution was poured into the vessel. As the positive electrode, a known foamed nickel electrode of 3.3 cm in width and 18 cm in length was used. Two plates serving as leads were also attached to the positive electrode. A polypropylene nonwoven fabric provided with a hydrophilic property was used as the separator. For the preparation of the electrolytic solution, 30 g of lithium hydroxide was dissolved in 1 lit. of an aqueous potassium hydroxide solution with a specific gravity of 1.25. Finally, the electrolytic cell was sealed, resulting in an enclosed-type nickel-hydrogen battery. The capacity of the nickel-hydrogen battery thus produced was limited by that of its positive electrode; the theoretical capacity of the battery was set at 3 Ah.

The characteristics of each battery produced in the above described manner were evaluated by an ordinary charging and discharging cycle test as follows: Twenty cycles of charging and discharging were repeated at a temperature of 20° C. In charging, each battery was charged up to 120% or 150% at 0.5 C (2 hour ratio). The discharging was performed at 0.2 C (5 hour ratio) and continued until the battery voltage decreased to 1.0 V. Then, the battery was kept at 65° C. The results are shown in FIG. 2.

Figure 2:
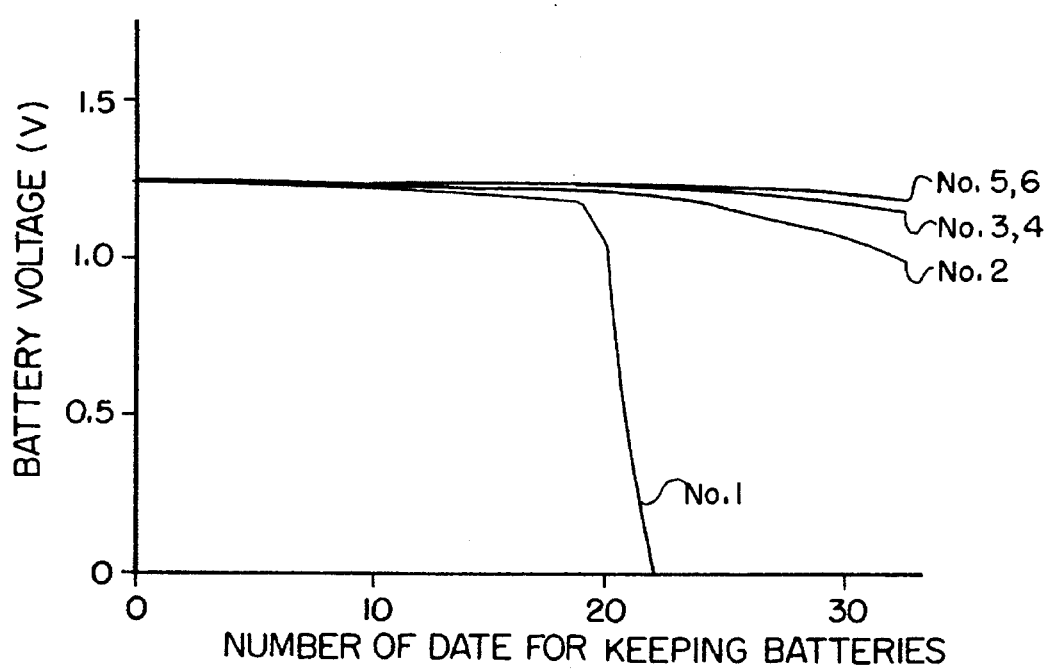
FIG. 2 shows the results for a shelf life test at 65° C. for a storage battery produced by using the hydrogen storing alloy produced in Example 1 of the present invention.

In FIG. 2, the abscissa indicates the battery voltage (V), while the ordinate indicates the number of the date (day) for which the battery was kept at 65° C. In a battery using Sample 1, that is, a conventional alloy, the battery voltage was rapidly decreased after the battery was kept at 65° C. for about 20 days. In batteries using Samples 2 to 6 including Al, the voltage was less decreased after they were kept at 65° C. for 30 days.

Figure 3:
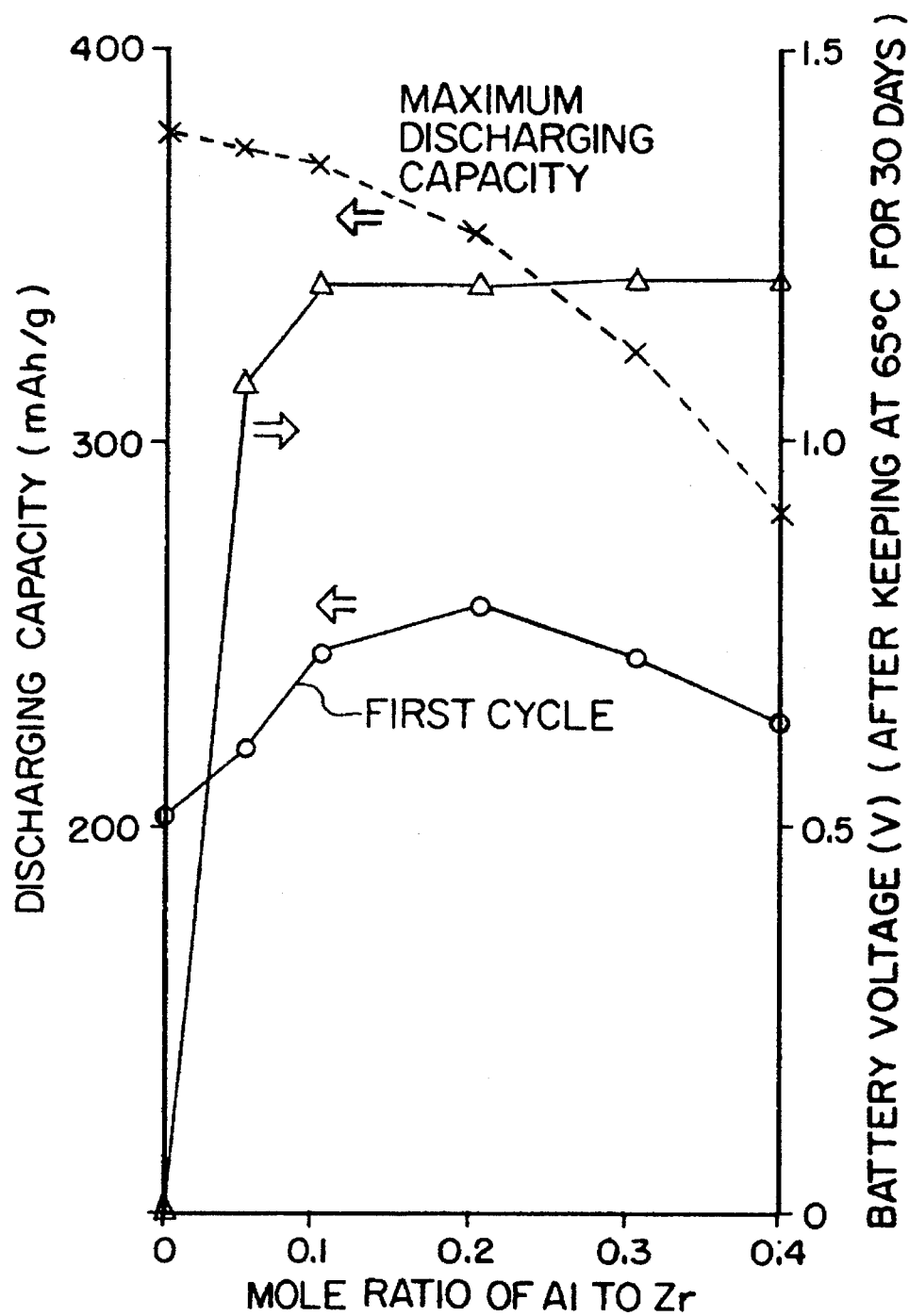
FIG. 3 is a graph obtained from the results shown in FIGS. 1 and 2 in order to find the optimum content of Al in the hydrogen storing alloy produced in Example 1 of the present invention.

The results of the half cell test and the shelf life test at 65° C. of the storage batteries are combined in FIG. 3. The abscissa indicates the mole ratio of Al to Zr, the left ordinate indicates the discharging capacity of a half cell (mAh/g) and the right ordinate indicates the battery voltage (V) after keeping the batteries at 65° C. for 30 days. The plot shown with ○ indicates a change in the discharging capacity in the first cycle in the half cell test. The plot shown with Δ indicates a change in the battery voltage after keeping the batteries at 65° C. for 30 days. The plot shown with X indicates a change in the maximum discharging capacity in the half cell test.

FIG. 3 shows that a hydrogen storing alloy electrode including Al in the mole ratio to Zr of 0.05 to 0.2 is excellent in early discharging characteristics and has a long lifetime at a high temperature of 65° C., while it still has the maximum discharging capacity almost identical to that of a hydrogen storing alloy electrode including no Al.

TABLE 1

| Sample No. | Composition |
| --- | --- |
| 1 | $ZrMn_{0.6}V_{0.2}Ni_{1.3}$ |
| 2 | $ZrMn_{0.6}V_{0.2}Al_{0.05}Ni_{1.3}$ |
| 3 | $ZrMn_{0.6}V_{0.2}Al_{0.1}Ni_{1.3}$ |
| 4 | $ZrMn_{0.6}V_{0.2}Al_{0.2}Ni_{1.3}$ |
| 5 | $ZrMn_{0.6}V_{0.2}Al_{0.3}Ni_{1.3}$ |
| 6 | $ZrMn_{0.6}V_{0.2}Al_{0.4}Ni_{1.3}$ |

(Example 2)

Sample alloys respectively having different compositions as listed in Table 2 below were produced in the same manner as in Example 1. In all the samples, y, the mole ratio of Al to Zr, was 0.1. In the production of samples having m, the mole ratio of Mn to Zr, of 0.8 or more, an induction heater was used instead of the arc melting furnace. That is because a large amount of Mn is evaporated when the starting materials are melted in the arc melting furnace, which makes it difficult to obtain the objective alloys.

Samples 12 to 20 are examples of the hydrogen storing alloy used in the present invention and Samples 7 to 11 are reference examples.

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15-type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. Especially, even samples having m, the mole ratio of Mn to Zr, of 0.8 or more had homogeneous compositions. The crystal lattice constants were within the range of 7.03 to 7.10 angstroms in all the obtained samples except for Sample 8, which had a crystal lattice constant of smaller than 7.03 angstroms.

Next, in the measurement of the PCT characteristics at 70° C., all the samples had almost the same hydrogenation characteristics except that Samples 8 and 9 exhibited a high hydrogen equilibrium pressure, and Sample 11 had a short plateau region in the PCT diagram. The other samples had a hydrogen absorbing capacity of 1.0 to 1.2 (H/M), which was about 15% larger than that of Sample 8, 9 or 11. Moreover, a heat treatment in vacuum made the plateau region in the PCT diagram longer, resulting in increasing the amount of hydrogen to be absorbed by or desorbed from the alloy. This also applied to alloys including no Al, which proved that the hydrogenation characteristics of an alloy including Al in the mole ratio to Zn of 0.1 were almost equal to those of an alloy including no Al.

2. A Half Cell Test

Figure 4:
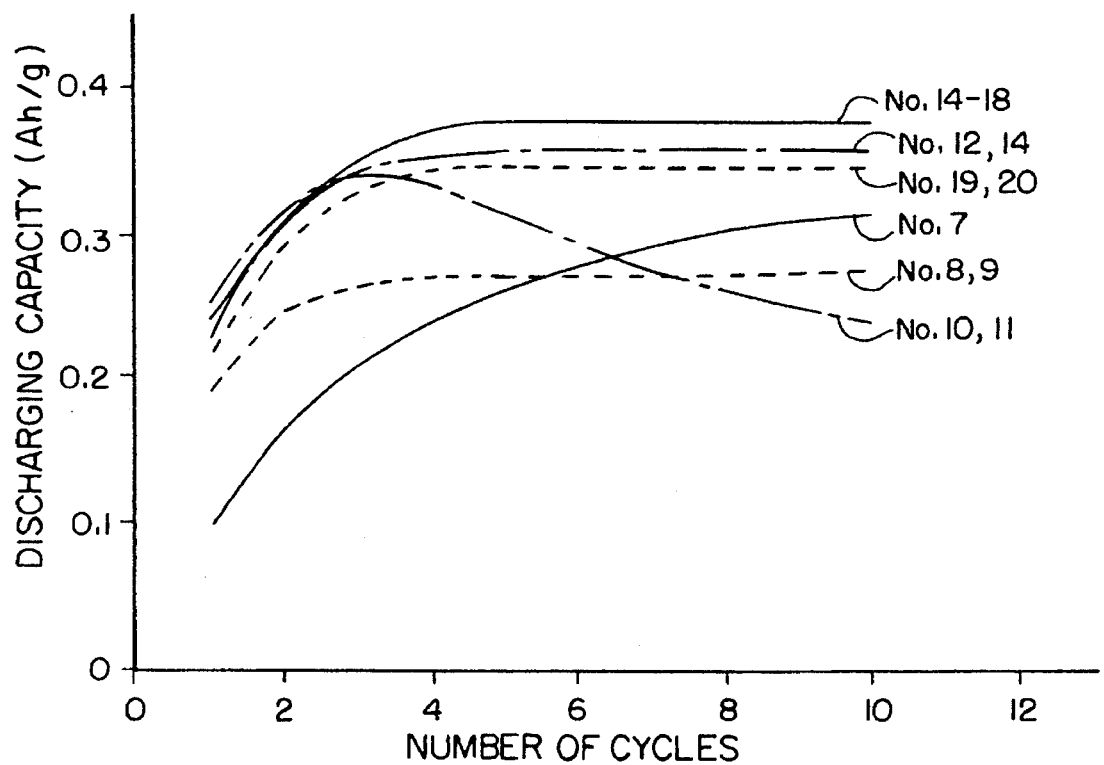
FIG. 4 shows the test results for a half cell produced by using a hydrogen storing alloy produced in Example 2 of the present invention.

A half cell test was performed on each of the alloy samples in the same manner as in Example 1. The results are shown in FIG. 4.

The early discharging characteristics were excellent in all the half cells. However, the cells using Samples 8, 9 and 11, which had a small hydrogen absorbing capacity, had a small saturation discharging capacity. The cell using Sample 7, which had only a small amount of Ni, was low in electrochemical activity, and had a small discharging capacity in the early cycles and a small saturation discharging capacity. In the cell using Sample 10, which had a comparatively large amount of Mn, a large amount of Mn was eluted into the alkaline electrolytic solution, thereby decreasing the discharging capacity in large after a repetition of charging and discharging cycles. On the contrary, Samples 12 to 20, which are the hydrogen storing alloy electrodes according to the present invention, exhibited little decrease in the saturation discharging capacity although they included Al. Moreover, these samples had a large saturation discharging capacity of 0.35 to 0.37 Ah/g, and were excellent in their early discharging characteristics.

3. Shelf Life Test of Enclosed-type Nickel-Hydrogen Storage Batteries

Figure 5:
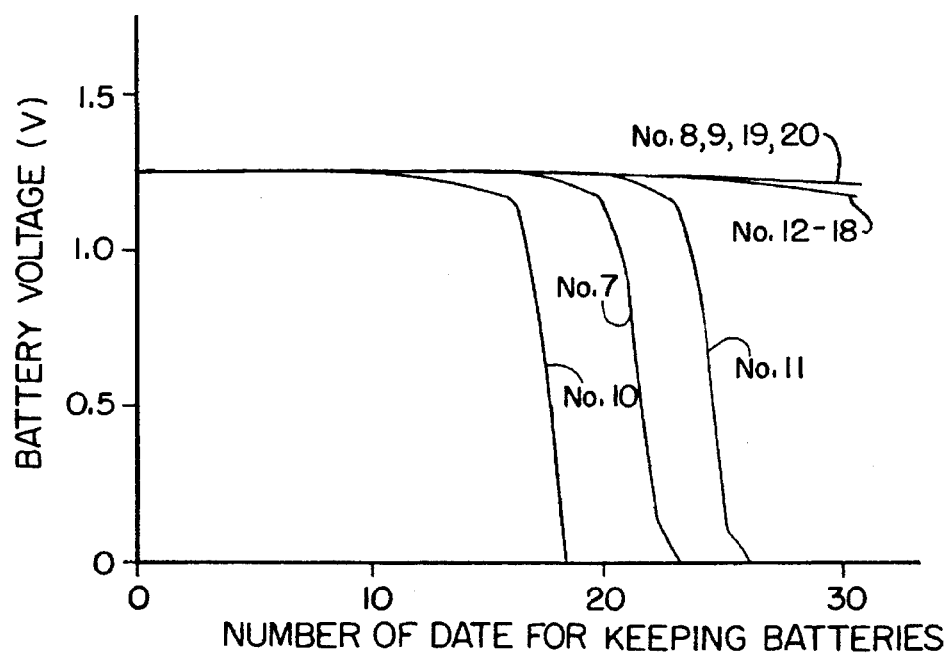
FIG. 5 shows the results for a shelf life test at 65° for a storage battery produced by using the hydrogen storing alloy produced in Example 2 of the present invention.

The above-mentioned samples were used to produce enclosed-type nickel-hydrogen storage batteries for the evaluation of the lifetime characteristics thereof at 65° C. as in Example 1. The results are shown in FIG. 5.

In the batteries using Samples 7, 10 and 11, the battery voltages were rapidly decreased after they were kept for about 20 to 25 days. This seems to be for the following reason: In Sample 7, since the constant of Ni is small, Al can not prevent alloy components from eluting into the alkaline electrolytic solution; in Sample 10, since the content of Mn is large, Al can not prevent alloy components from eluting into the alkaline electrolytic solution; and in Sample 11, since the content of V is large, Al can not prevent alloy components from eluting into the alkaline electrolytic solution. The other batteries exhibited little decrease in the battery voltages even after they were kept for 30 days.

The results of the half cell test and the shelf life test at 65° C. show that the hydrogen storing alloy electrodes according to the present invention have a large discharging capacity and a long lifetime at a high temperature of 65° C., and are excellent in their early discharging characteristics.

TABLE 2

| Sample No. | Composition |
| --- | --- |
| 7 | $ZrMn_{0.8}V_{0.3}Al_{0.1}Ni_{0.9}$ |
| 8 | $ZrMn_{0.5}V_{0.1}Al_{0.1}Ni_{1.6}$ |
| 9 | $ZrMn_{0.9}V_{0.3}Al_{0.1}Ni_{1.4}$ |
| 10 | $ZrMn_{0.9}V_{0.2}Al_{0.1}Ni_{1.1}$ |
| 11 | $ZrMn_{0.5}V_{0.4}Al_{0.1}Ni_{1.2}$ |
| 12 | $ZrMn_{0.8}V_{0.3}Al_{0.1}Ni_{1.0}$ |
| 13 | $ZrMn_{0.7}V_{0.2}Al_{0.1}Ni_{1.1}$ |
| 14 | $ZrMn_{0.6}V_{0.3}Al_{0.1}Ni_{1.2}$ |
| 15 | $ZrMn_{0.8}V_{0.2}Al_{0.1}Ni_{1.1}$ |
| 16 | $ZrMn_{0.8}V_{0.2}Al_{0.1}Ni_{1.2}$ |
| 17 | $ZrMn_{0.7}V_{0.3}Al_{0.1}Ni_{1.1}$ |
| 18 | $ZrMn_{0.7}V_{0.3}Al_{0.1}Ni_{1.2}$ |
| 19 | $ZrMn_{0.5}V_{0.2}Al_{0.1}Ni_{1.3}$ |
| 20 | $ZrMn_{0.4}V_{0.3}Al_{0.1}Ni_{1.4}$ |

(Example 3)

Sample alloys represented by the formula $ZrMn_{0.6}V_{0.2}W_yNi_{1.3}$ (wherein $0.1 \leq y \leq 0.3$), respectively having different compositions as listed in Table 3, were produced in the same manner as in Example 1. In this example, W as used instead of Al as one of the starting materials.

Samples 21 to 23 are examples of the hydrogen storing alloy used in the present invention and Samples 24 to 26 are reference examples having a larger y, the mole ratio of W to Zr (i.e., y=0.15 in Sample 24, y=0.2 in Sample 25, and y=0.3 in Sample 26).

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15 -type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. The crystal lattice constants decreased as y, the mole ratio of W to Zr, increased, and were within the range of 7.04 to 7.10 angstroms in all the obtained samples.

Next, in the measurement of the PCT characteristics at 70° C., all the samples had almost the same hydrogenation characteristics, but the samples having a y, the mole ratio of W to Zr, of more than 0.1 had a little decreased amount of the hydrogen absorbing capacity. Moreover, a heat treatment in vacuum made the plateau region in the PCT diagram longer, resulting in increasing the amount of hydrogen to be absorbed by or desorbed from the alloy.

2. A Half Cell Test

A half cell test was performed on each of the above-mentioned alloy samples in the same manner as in Example 1 except that they were ground to 300 mesh or finer in producing the half cells. The results are shown in FIG. 6.

Figure 6:
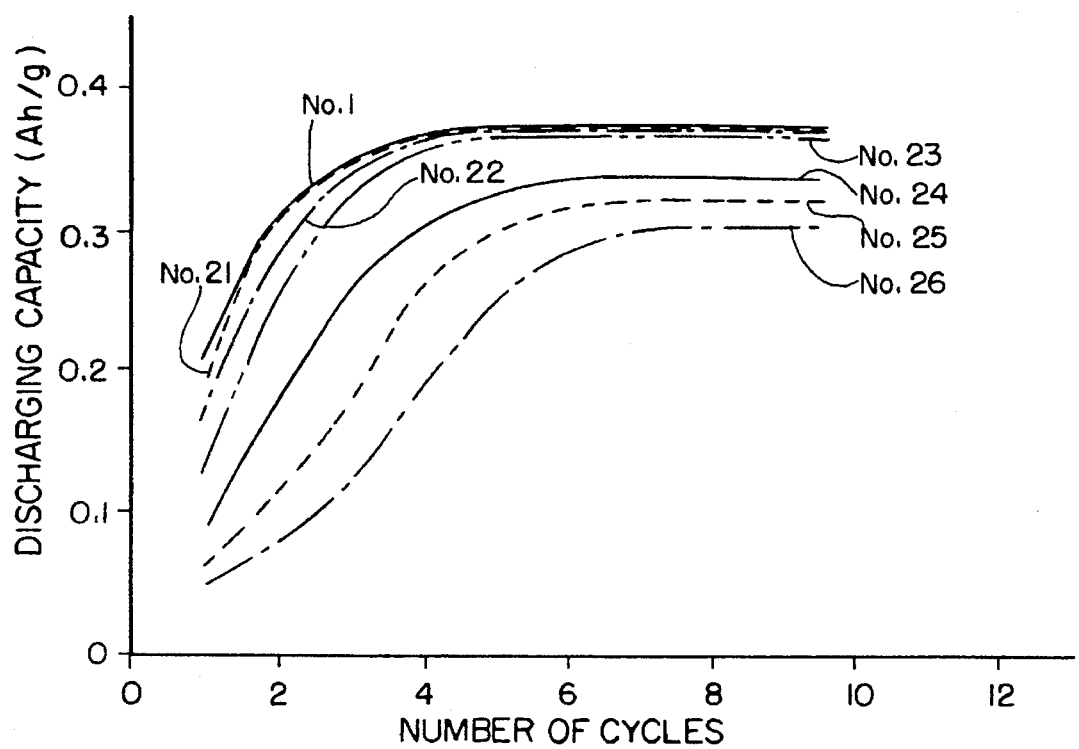
FIG. 6 shows the test results for a half cell produced by using a hydrogen storing alloy produced in Example 3 of the present invention.

The results shown in FIG. 6 indicate that the early discharging characteristics are degraded as y, the mole ratio of W to Zr, increases. The cells using Samples 24 to 26 had a discharging capacity in the first cycles 40% or less of that of Sample 1 including no W. On the contrary, the cells using Samples 21 to 23 had a discharging capacity in the first cycles 60% or more of that of Sample 1 including no W. This proved that the early discharging characteristics are not largely degraded in the hydrogen storing alloys used in the present invention.

3. Shelf Life Test of Enclosed-type Nickel-Hydrogen Storage Batteries

Figure 7:
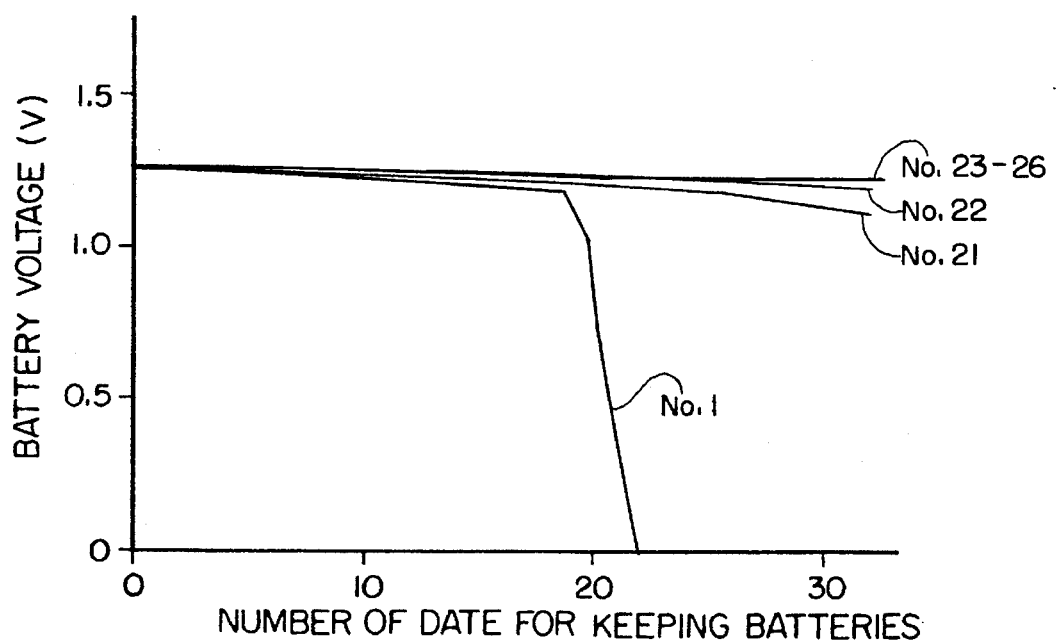
FIG. 7 shows the results for a shelf life test at 65° C. for a storage battery produced by using the hydrogen storing alloy produced in Example 3 of the present invention.

The above-mentioned samples were used to produce enclosed-type nickel-hydrogen storage batteries for the evaluation of the lifetime characteristics thereof at 65° C. as in Example 1 except that the alloy samples were ground to 300 mesh or finer in producing the batteries. The results are shown in FIG. 7.

In the battery using Sample 1, that is, a conventional alloy, the battery voltage was rapidly decreased after it was kept for more than 20 days. In the batteries using Samples 21 to 26 including W, the battery voltages were little decreased even after they were kept for 30 days.

Figure 8:
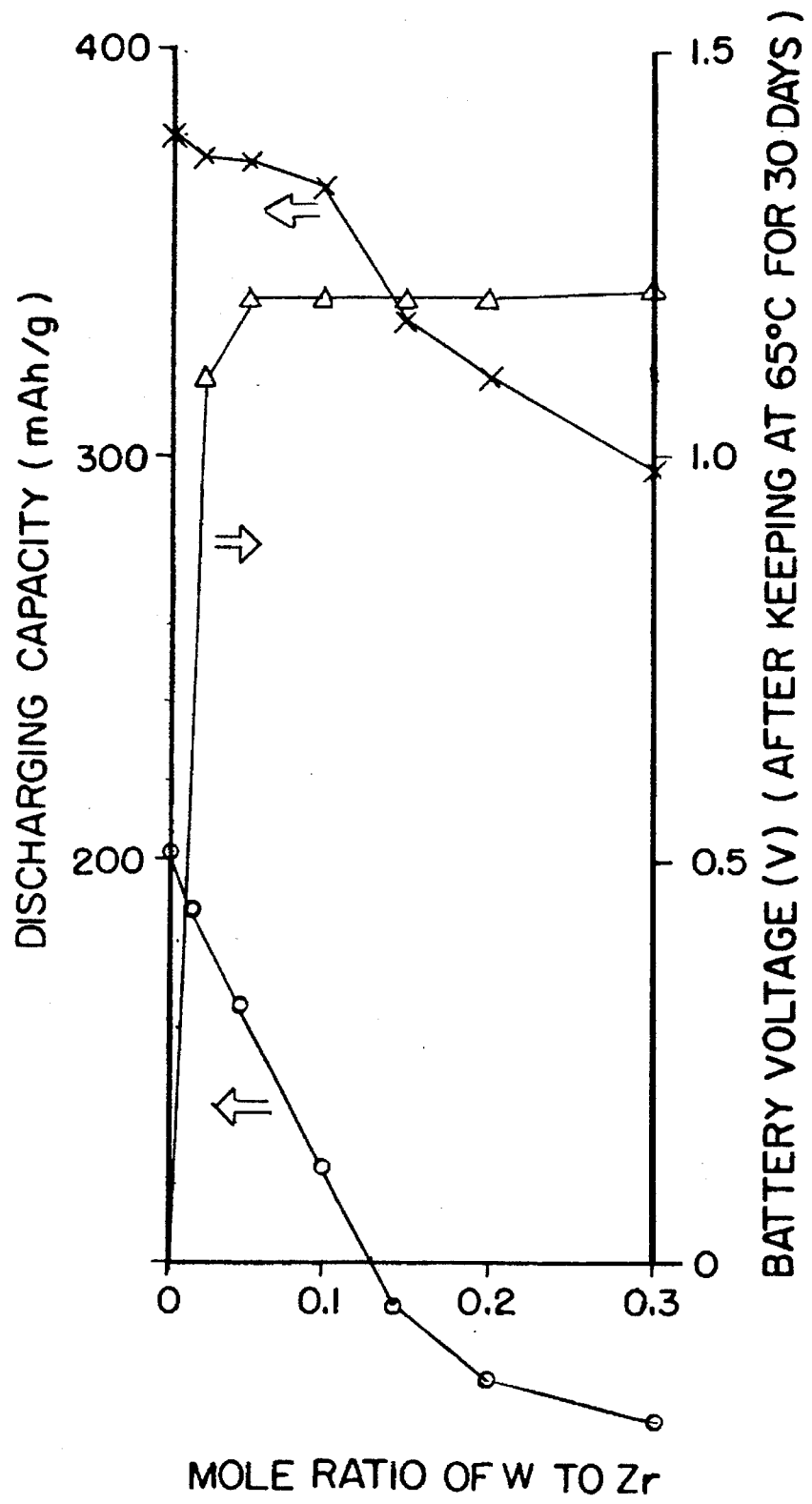
FIG. 8 is a graph obtained from the results shown in FIGS. 6 and 7 in order to find the optimum content of W in the hydrogen storing alloy produced in Example 3 of the present invention.

The results of the half cell test and the shelf life test at 65° C. of the storage batteries are combined in FIG. 8. The abscissa indicates the mole ratio of W to Zr, the left ordinate indicates the discharging capacity of a half cell (mAh/g) and the right ordinate indicates the battery voltage (V) after keeping the batteries at 65° C. for 30 days. The plot shown with o indicates a change in the discharging capacity in the first cycle in the half cell test. The plot shown with Δ indicates a change in the battery voltage after keeping the batteries at 65° C. for 30 days. The plot shown with X indicates a change in the maximum discharging capacity in the half cell test.

FIG. 8 shows that a hydrogen storing alloy electrode including W in the mole ratio to Zr in the range of 0.01 to 0.1 is excellent in early discharging characteristics and has a long lifetime at a high temperature of 65° C., while it still has the maximum discharging capacity almost identical to that of a hydrogen storing alloy electrode including no W. This is because W can prevent the other alloy compositions from eluting into the alkaline electrolytic solution. However, since W also has an effect to degrade the electrochemical activity in the early charging and discharging cycles, the early discharging characteristics are degraded as the content of W increases. But this effect of W is not much affected if y, the mole ratio of W to Zr, is 0.1 or less.

TABLE 3

| Sample No. | Composition |
| --- | --- |
| 1 | $ZrMn_{0.6}V_{0.2}Ni_{1.3}$ |
| 21 | $ZrMn_{0.6}V_{0.2}W_{0.01}Ni_{1.3}$ |
| 22 | $ZrMn_{0.6}V_{0.2}W_{0.05}Ni_{1.3}$ |
| 23 | $ZrMn_{0.6}V_{0.2}W_{0.1}Ni_{1.3}$ |
| 24 | $ZrMn_{0.6}V_{0.2}W_{0.15}Ni_{1.3}$ |
| 25 | $ZrMn_{0.6}V_{0.2}W_{0.2}Ni_{1.3}$ |
| 26 | $ZrMn_{0.6}V_{0.2}W_{0.3}Ni_{1.3}$ |

(Example 4)

Sample alloys respectively having different compositions as listed in Table 4 were produced in the same manner as in Example 1 except that W was used instead of Al as one of the starting materials. In all the samples, ẏ, the mole ratio of W to Zr, was 0.05. In the production of samples having an m, the mole ratio of Mn to Zr, of 0.8 or more, an induction heater was used instead of the arc melting furnace as in Example 2.

Samples 32 to 40 are examples of the hydrogen storing alloy used in the present invention and Samples 27 to 31 are reference examples.

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15 -type Laves phases) were higher and more acute in the heat-treated alloys than in those subject to no heat treatment. This indicates that the heat treatment increased the proportion of the C15-type Laves phases to the entire part of each alloy and accordingly improved the homogeneity and crystallinity thereof. Especially, even samples having an m, the mole ratio of Mn to Zr, of 0.8 or more had homogeneous compositions. The crystal lattice constants were within the range of 7.03 to 7.10 angstroms in all the obtained samples except for Sample 29, which had a crystal lattice constant of smaller than 7.03 angstroms.

Next, in the measurement of the PCT characteristics at 70° C., all the samples had almost the same hydrogenation characteristics except that Samples 28 and 29 exhibited a high hydrogen equilibrium pressure, and Samples 29 and 31 had a short plateau region in the PCT diagram. The other samples had a hydrogen absorbing capacity of 1.0 to 1.2 (H/M), which was about 20% larger than that of Sample 28, 29 or 31. Moreover, a heat treatment in vacuum made the plateau region in the PCT diagram longer, resulting in increasing the amount of hydrogen to be absorbed by or desorbed from the alloy. This also applied to alloys including no W, which proved that the hydrogenation characteristics of an alloy including W in the mole ratio to Zr of 0.05 were almost equal to those of an alloy including no W.

2. A Half Cell Test

Figure 9:
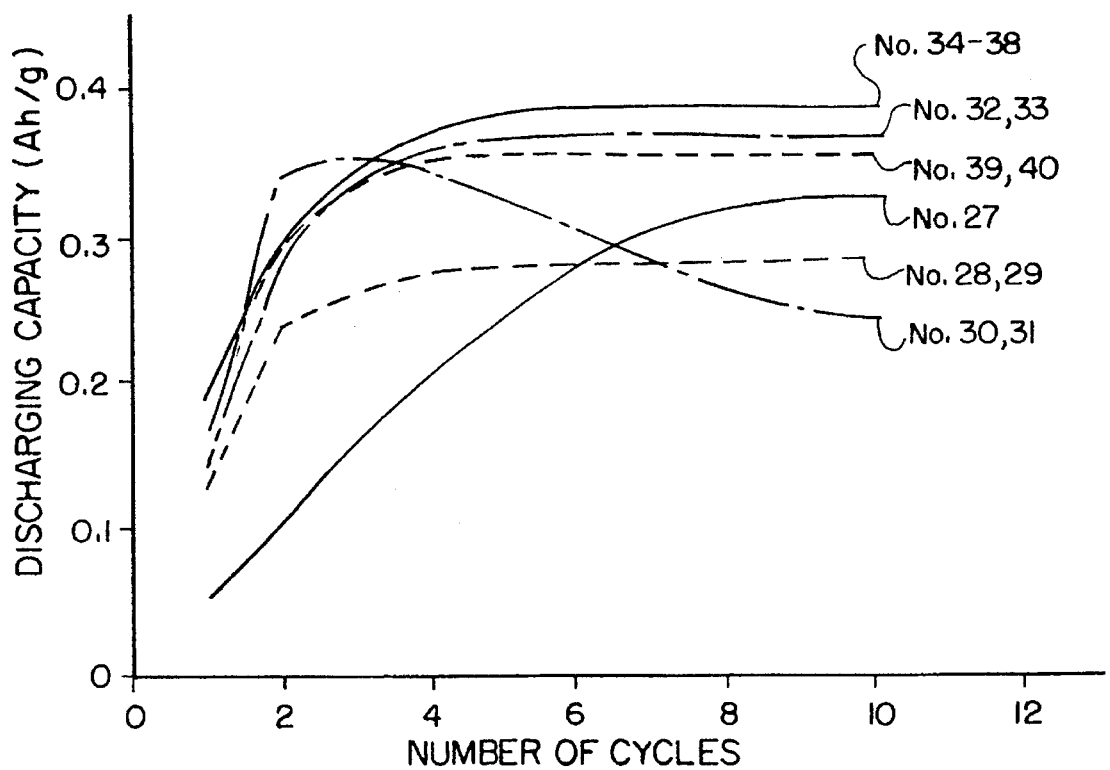
FIG. 9 shows the test results for a half cell produced by using a hydrogen storing alloy produced in Example 4 of the present invention.

A half cell test was performed on each of the above-mentioned alloy samples in the same manner as in Example 3. The results are shown in FIG. 9.

The early discharging characteristics were excellent in all the half cells except for the cell using Sample 27. W did not decrease the discharging capacity in the early cycles. However, the cells using Samples 28, 29 and 31, which had a small hydrogen absorbing capacity, had a small saturation discharging capacity. The cell using Sample 27, which had only a small amount of Ni, was low in the electrochemical activity, and had a small discharging capacity in the early cycles and a small saturation discharging capacity. In the cell using Sample 30, which had a comparatively large amount of Mn, a large amount of Mn was eluted into the alkaline electrolytic solution, thereby decreasing the discharging capacity largely after a number of charging and discharging cycles. On the contrary, the hydrogen storing alloy electrodes using Samples 32 to 40 according to the present invention exhibited little decrease in the saturation discharging capacity although they included W. Moreover, these electrodes using the above samples had a large saturation discharging capacity of 0.35 to 0.38 Ah/g.

3. Shelf Life Test of Enclosed-type Nickel-Hydrogen Storage Batteries

Figure 10:
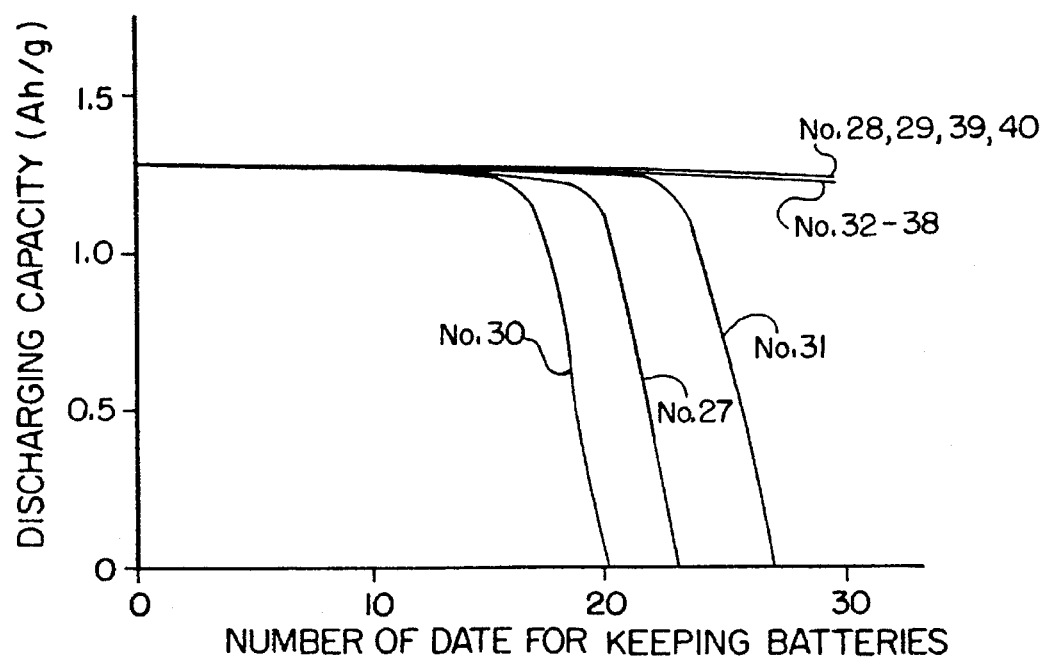
FIG. 10 shows the results for a shelf life test at 65° C. for a storage battery produced by using the hydrogen storing alloy produced in Example 4 of the present invention.

The above-mentioned samples were used to produce enclosed-type nickel-hydrogen storage batteries for the evaluation of the lifetime characteristics thereof at 65° C. as in Example 3. The results are shown in FIG. 10.

In the batteries using Samples 27, 30 and 31, the battery voltages were rapidly decreased after they were kept for about 20 to 25 days. This seems to be for the following reason: In Sample 27, since the content of Ni is small, W can not prevent alloy components from eluting into the alkaline electrolytic solution; in Sample 30, since the content of Mn is large, W can not prevent alloy components from eluting into the alkaline electrolytic solution; and in Sample 31, since the content of V is large, W can not prevent alloy components from eluting into the alkaline electrolytic solution. The other batteries exhibited little decrease in their battery voltages even after they were kept for 30 days.

The results of the half cell test and the shelf life test at 65° C. show that the hydrogen storing alloy electrodes according to the present invention have a large discharging capacity and a long lifetime at a high temperature of 65° C., and are excellent in early discharging characteristics.

TABLE 4

| Sample No. | Composition |
| --- | --- |
| 27 | $ZrMn_{0.8}V_{0.3}W_{0.05}Ni_{0.9}$ |
| 28 | $ZrMn_{0.5}V_{0.1}W_{0.05}Ni_{1.6}$ |
| 29 | $ZrMn_{0.3}V_{0.3}W_{0.05}Ni_{1.4}$ |
| 30 | $ZrMn_{0.9}V_{0.2}W_{0.05}Ni_{1.2}$ |
| 31 | $ZrMn_{0.5}V_{0.4}W_{0.05}Ni_{1.2}$ |
| 32 | $ZrMn_{0.8}V_{0.3}W_{0.05}Ni_{1.0}$ |
| 33 | $ZrMn_{0.7}V_{0.2}W_{0.05}Ni_{1.1}$ |
| 34 | $ZrMn_{0.6}V_{0.3}W_{0.05}Ni_{1.2}$ |
| 35 | $ZrMn_{0.8}V_{0.2}W_{0.05}Ni_{1.1}$ |
| 36 | $ZrMn_{0.8}V_{0.2}W_{0.05}Ni_{1.2}$ |
| 37 | $ZrMn_{0.7}V_{0.3}W_{0.05}Ni_{1.1}$ |
| 38 | $ZrMn_{0.7}V_{0.3}W_{0.05}Ni_{1.2}$ |
| 39 | $ZrMn_{0.5}V_{0.2}W_{0.05}Ni_{1.3}$ |
| 40 | $ZrMn_{0.4}V_{0.3}W_{0.05}Ni_{1.4}$ |

(Example 5)

Sample alloys respectively having different compositions as listed in Table 5 were produced in the same manner as in Example 1 except that Cr or Zn was used instead of Al as one of the starting materials.

Samples 48 to 56 are examples of the hydrogen storing alloy used in the present invention and Samples 41 to 47 are reference examples.

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15 -type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof.

2. A Half Cell Test

A half cell test was performed on each of the above-mentioned alloy samples in the same manner as in Example 1 except that they were ground to 400 mesh or finer in producing the half cells. The results are shown in FIG. 11.

Figure 11:
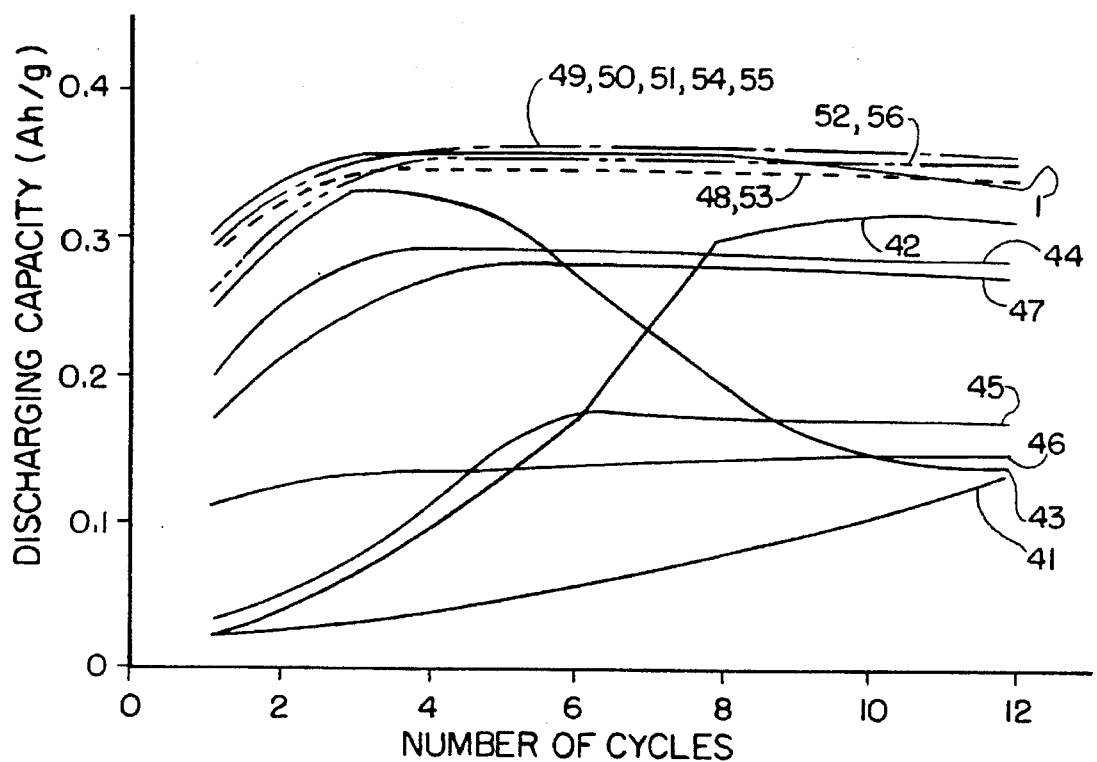
FIG. 11 shows the test results for a half cell produced by using a hydrogen storing alloy produced in Example 5 of the present invention.

As is shown in FIG. 11, the cells using Samples 41, 42 and 45 had extremely low discharging capacities 0.03 to 0.05 Ah/g in the first and second cycles. The cells using Samples 41, 45 and 46 had a low discharging capacity of about 0.15 Ah/g after the tenth cycle. The cells using Samples 48 to 56, the hydrogen storing alloys used in the present invention, had the discharging capacity of 0.25 Ah/g or more in the first cycle, about 0.3 Ah/g in the second cycle, and a fixed capacity of 0.34 to 0.36 Ah/g after the third cycle. Accordingly, the hydrogen storing alloy electrode according to the present invention was found to have a large discharging capacity in the early cycles and a larger saturation discharging capacity than the electrode using the conventional alloy.

3. Shelf Life Test of Enclosed-type Nickel-Hydrogen Storage Batteries

Using Samples 1, 42, 45, 47, 49, 51 and 56, the enclosed-type nickel-hydrogen storage batteries were produced in the same manner as in Example 1 except that they were ground to 400 mesh or finer.

Ten such enclosed-type nickel-hydrogen batteries were produced for each of the seven alloy samples and were evaluated by an ordinary charging and discharging cycle test as follows: The charging and discharging cycle was repeated at a temperature of 20° C. In charging, each battery was charged up to 150% at 0.5 C (2 hour ratio). The discharging was performed at 0.2 C (5 hour ratio) and continued until the battery voltage decreased to 1.0 V.

As a result, in the batteries using Samples 1, 49, 51 and 56, the discharging capacity in the early charging and discharging cycles were a little smaller than the theoretical capacity. But after a repetition of 2 to 4 cycles, the actual discharging capacity reached the theoretical capacity, which is 3.0 Ah. In the batteries using Samples 42 and 45, the discharging capacity was as small as 1.8 Ah/g even after repeating several tens of cycles. Moreover, the battery using Sample 47 had a comparatively large discharging capacity in the early cycles, which was 1.9 Ah/g, and even after the repetition of charging and discharging cycles, the maximum discharging capacity was 2.4 Ah/g. On the contrary, the batteries using Samples 49, 51 and 56, according to the present invention, maintained stable battery characteristics in charging and discharging tests for up to 500 cycles.

Figure 12:
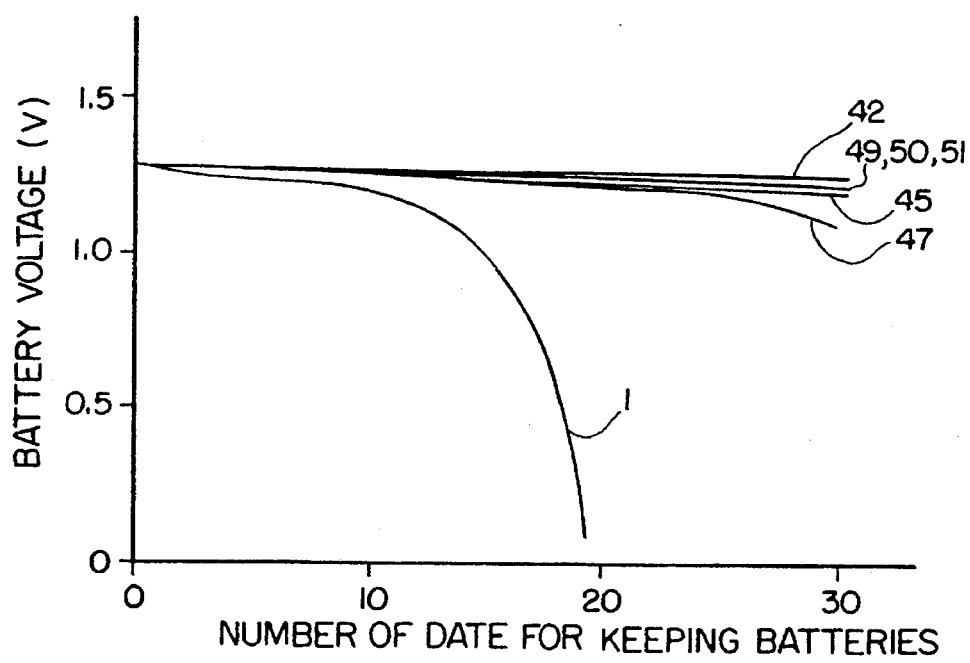
FIG. 12 shows the results for a shelf life test at 65° C. for a storage battery produced by using the hydrogen storing alloy produced in Example 5 of the present invention.

Next, the shelf life test at 65° C. was conducted in the same manner as in Example 1. The results are shown in FIG. 12.

In the battery using Sample 1 including neither Cr nor Zn, the battery voltage was rapidly decreased after it was kept at 65° C. for more than 10 days. In the battery using the sample alloys including either Cr or Zn, the battery voltage was little decreased even after they were kept for 30 days, although in the battery using Sample 47 including Zn, the battery voltage was a little decreased.

These results show that the present invention provides a hydrogen storing alloy electrode having a large discharging capacity and a long lifetime at a high temperature, and being excellent in early discharging characteristics.

TABLE 5

| Sample No. | Composition |
|---|---|
| 1 | $ZrMn_{0.6}V_{0.2}Ni_{1.3}$ |
| 41 | $ZrMn_{0.5}V_{0.1}Cr_{0.4}Ni_{1.2}$ |
| 42 | $ZrMn_{0.6}V_{0.2}Cr_{0.2}Ni_{1.2}$ |
| 43 | $ZrMn_{0.9}V_{0.1}Zn_{0.2}Ni_{1.2}$ |
| 44 | $ZrMn_{0.3}V_{0.3}Zn_{0.2}Ni_{1.3}$ |
| 45 | $ZrMn_{0.8}V_{0.3}Zn_{0.2}Ni_{0.8}$ |
| 46 | $ZrMn_{0.4}V_{0.1}Zn_{0.1}Ni_{1.7}$ |
| 47 | $ZrMn_{0.6}V_{0.4}Zn_{0.1}Ni_{1.2}$ |
| 48 | $ZrMn_{0.4}V_{0.2}Zn_{0.2}Ni_{1.3}$ |
| 49 | $ZrMn_{0.6}V_{0.2}Zn_{0.2}Ni_{1.3}$ |
| 50 | $ZrMn_{0.8}V_{0.2}Zn_{0.2}Ni_{1.2}$ |
| 51 | $ZrMn_{0.6}V_{0.2}Zn_{0.1}Ni_{1.3}$ |
| 52 | $ZrMn_{0.6}V_{0.2}Zn_{0.2}Ni_{1.1}$ |
| 53 | $ZrMn_{0.4}V_{0.3}Zn_{0.2}Ni_{1.3}$ |
| 54 | $ZrMn_{0.6}V_{0.3}Zn_{0.2}Ni_{1.3}$ |
| 55 | $ZrMn_{0.8}V_{0.3}Zn_{0.1}Ni_{1.2}$ |
| 56 | $ZrMn_{0.6}V_{0.3}Zn_{0.2}Ni_{1.1}$ |

(Example 6)

Sample alloys represented by the formula $ZrMn_{0.6}V_{0.2}Co_{0.1}Al_uNi_{1.2}$ (wherein $0.5 \leq u \leq 0.4$), respectively having different compositions as listed in Table 6, were produced in the same manner as in Example 1. In this example, Co was further used as one of the starting materials.

Samples 58 to 60 are examples of the hydrogen storing alloy used in the present invention and Sample 57 is a conventional alloy including no Al. Samples 61 and 62 are reference examples having a larger u, the mole ratio of Al to Zr (i.e., u=0.3 in Sample 61 and u=0.4 in Sample 62).

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15-type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. The crystal lattice constants decreased as u, the mole ratio of Al to Zr, increased, and were within the range of 7.04 to 7.10 angstroms in all the obtained samples.

Next, in the measurement of the PCT characteristics at 70° C., all the samples had almost the same hydrogenation characteristics, but the samples having a u, the mole ratio of Al to Zr, of more than 0.2 had a greatly decreased amount of hydrogen absorbing capacity. Moreover, a heat treatment in vacuum made the plateau region in the PCT diagram longer, resulting in increasing the amount of hydrogen to be absorbed by or desorbed from the alloy.

2. A Half Cell Test

A half cell test was performed on each of the above-mentioned alloy samples in the same manner as in Example 3. The results are shown in FIG. 13.

Figure 13:
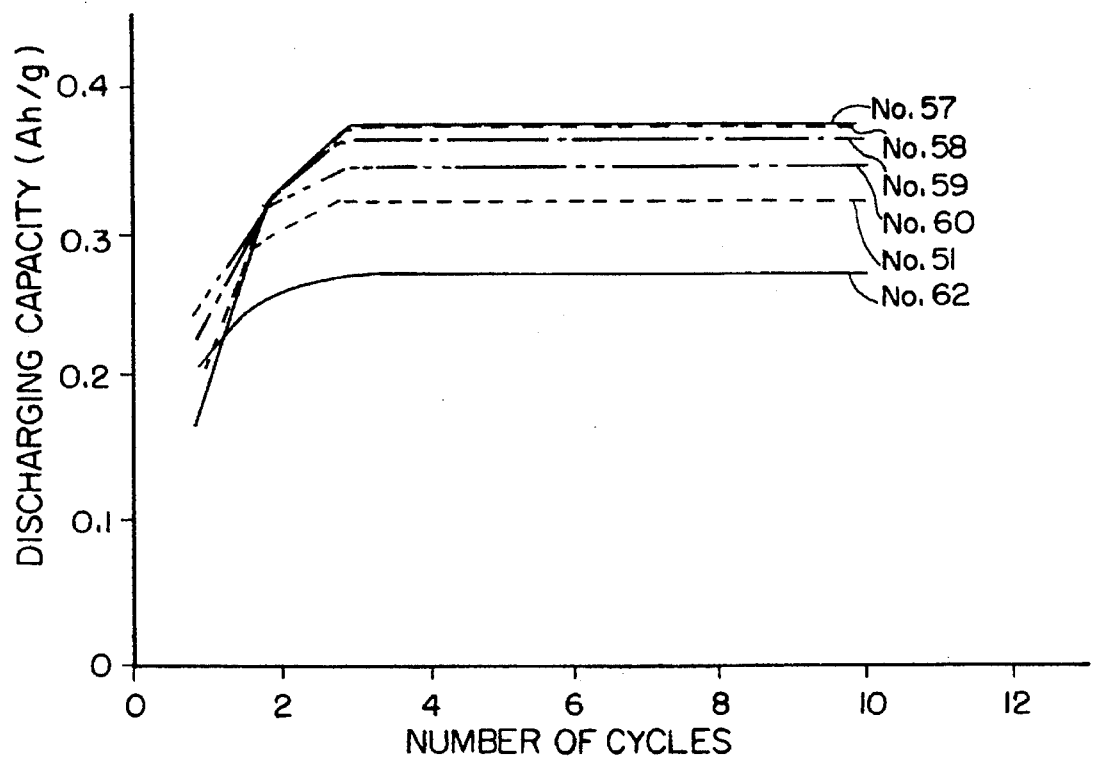
FIG. 13 shows the test results for a half cell produced by using a hydrogen storing alloy produced in Example 6 of the present invention.

The results shown in FIG. 13 indicate that the saturation discharging capacity is decreased as u, the mole ratio of Al to Zr, increases. However, as for the discharging capacity in the first cycle and the early discharging characteristics, the cells using the sample alloys including Al showed larger values than that using Sample 57 including no Al.

3. Shelf Life Test of Enclosed-type Nickel-Hydrogen Storage Batteries

Figure 14:
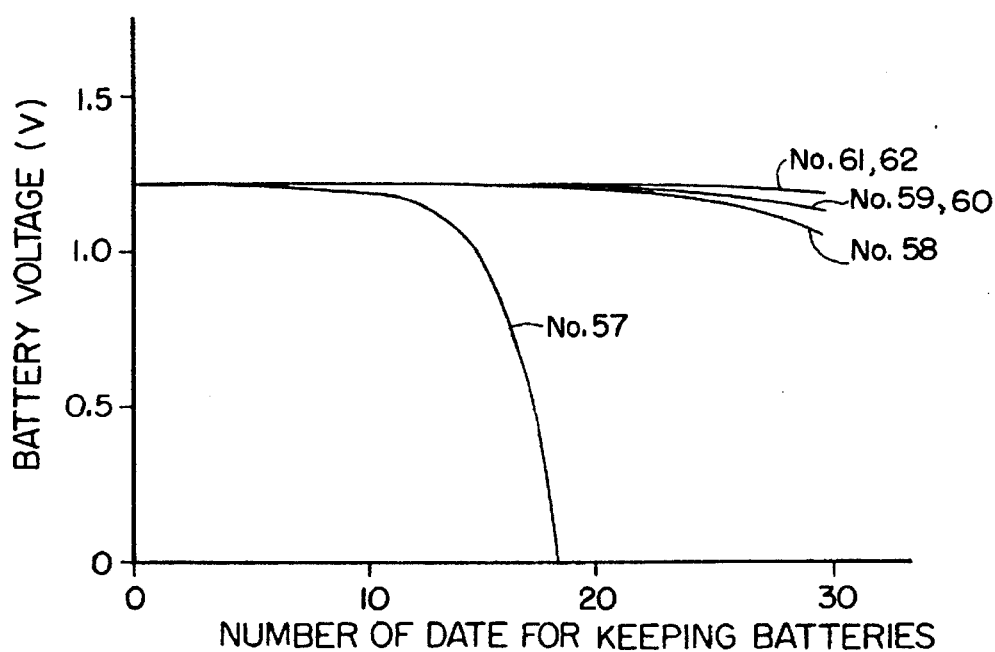
FIG. 14 shows the results for a shelf life test at 65° C. for a storage battery produced by using the hydrogen storing alloy produced in Example 6 of the present invention.

The above-mentioned samples were used to produce enclosed-type nickel-hydrogen storage batteries for the evaluation of the lifetime characteristics thereof at 65° C. as in Example 3. The results are shown in FIG. 14.

In the battery using Sample 57, that is, a conventional alloy, the battery voltage was rapidly decreased after it was kept for more than 10 days. In the batteries using Samples 58 to 62 including Al, the battery voltages were little decreased even after keeping the batteries for 30 days.

These results show that a hydrogen storing alloy electrode including Al in the mole ratio to Zr in the range of 0.05 to 0.2 is excellent in the early discharging characteristics and has a long lifetime at a high temperature of 65° C., while it still has maximum discharging capacity almost identical to that of a hydrogen storing alloy electrode including no Al.

TABLE 6

| Sample No. | Composition |
|---|---|
| 57 | $ZrMn_{0.6}V_{0.2}Co_{0.1}Ni_{1.2}$ |
| 58 | $ZrMn_{0.6}V_{0.2}Co_{0.1}Al_{0.05}Ni_{1.2}$ |
| 59 | $ZrMn_{0.6}V_{0.2}Co_{0.1}Al_{0.1}Ni_{1.2}$ |

TABLE 6-continued

| Sample No. | Composition |
| --- | --- |
| 60 | $ZrMn_{0.6}V_{0.2}Co_{0.1}Al_{0.2}Ni_{1.2}$ |
| 61 | $ZrMn_{0.6}V_{0.2}Co_{0.1}Al_{0.3}Ni_{1.2}$ |
| 62 | $ZrMn_{0.6}V_{0.2}Co_{0.1}Al_{0.4}Ni_{1.2}$ |

(Example 7)

Sample alloys respectively having different compositions as listed in Table 7 were produced in the same manner as in Example 1 except that Fe or Co was further used as one of the starting materials. In all the samples, u, the mole ratio of Al to Zr, was 0.03. In the production of samples having an m, the mole ratio of Mn to Zr, of 0.8 or more, an induction heater was used instead of the arc melting furnace as in Example 2.

Samples 69 to 81 are examples of the hydrogen storing alloy used in the present invention and Samples 63 to 68 are reference examples.

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structure (C15-type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. Especially, even samples having an m, the mole ratio of Mn to Zr, of 0.8 or more had homogeneous compositions. The crystal lattice constants were within the range of 7.03 to 7.10 angstroms in all the obtained samples except for Sample 64, which had a crystal lattice constant of smaller than 7.03 angstroms.

Next, in the measurement of the PCT characteristics at 70° C., all the samples had almost the same hydrogenation characteristics except that Samples 64 and 68 exhibited a high hydrogen equilibrium pressure, and Samples 65 and 67 had a short plateau region in the PCT diagram. The other samples had a hydrogen absorbing capacity of 1.0 to 1.2 (H/M), which was about 10 to 20% larger than that of Sample 64, 65, 67 or 68. Moreover, a heat treatment in vacuum made the plateau region in the PCT diagram longer, resulting in increasing the amount of hydrogen to be absorbed by or desorbed from the alloy. This also applied to alloys including no Al, which proved that the hydrogenation characteristics of an alloy including Al in the mole ratio of Zr of 0.03 were almost equal to those of an alloy including no Al.

2. A Half Cell Test

Figure 15:
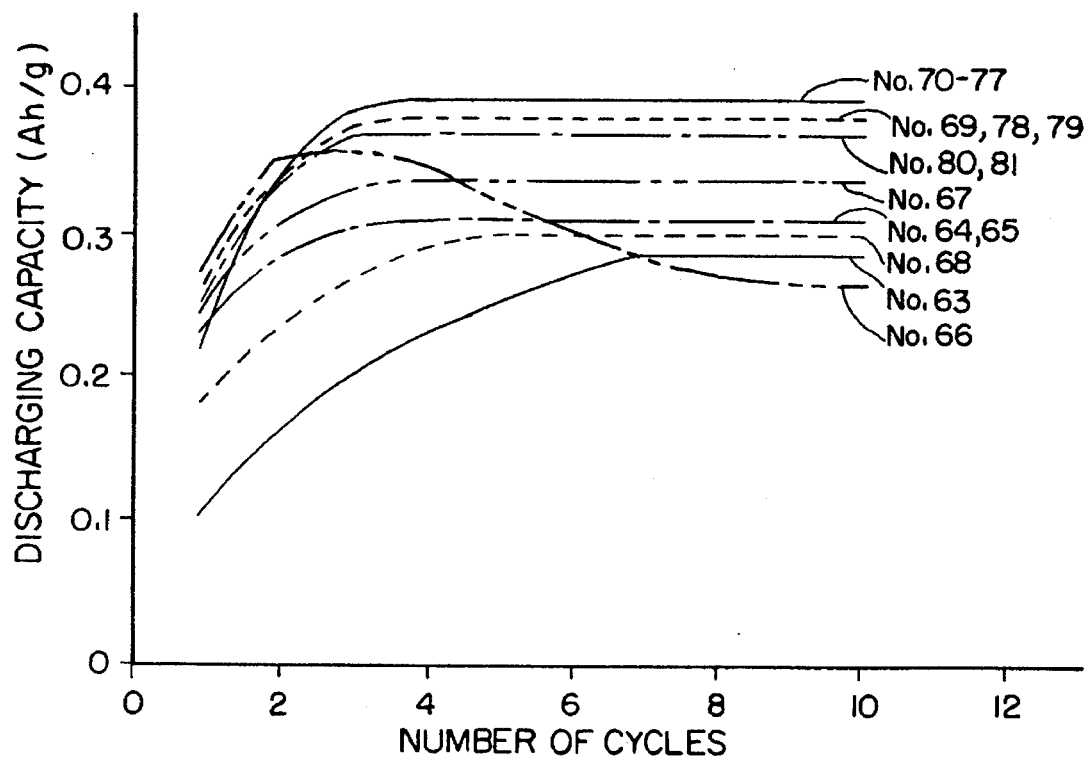
FIG. 15 shows the test results for a half cell produced by using a hydrogen storing alloy produced in Example 7 of the present invention.

A half cell test was performed on each of the above-mentioned alloy samples in the same manner as in Example 3. The results are shown in FIG. 15.

The early discharging characteristics were found to be improved by adding Al in all the half cells. However, the cells using Samples 64, 65, 67 and 68, which had a small hydrogen absorbing capacity, had a small saturation discharging capacity. The cell using Sample 63, which had only a small amount of Ni, was low in electrochemical activity, and had a small discharging capacity in the early cycles and a small saturation discharging capacity. In the cell using Sample 66, which had a comparatively large amount of Mn, a large amount of Mn was eluted into the alkaline electrolytic solution, thereby decreasing the discharging capacity largely after a number of charging and discharging cycles. On the contrary, the cells using Samples 69 to 81, which are the hydrogen storing alloy electrodes according to the present invention, exhibited little decrease in the saturation discharging capacity although they included Al. Moreover, these cells had a large early discharging capacity and had a large saturation discharging capacity of 0.34 to 0.37 Ah/g.

3. Shelf Life Test of Enclosed-type Nickel-Hydrogen Storage Batteries

Figure 16:
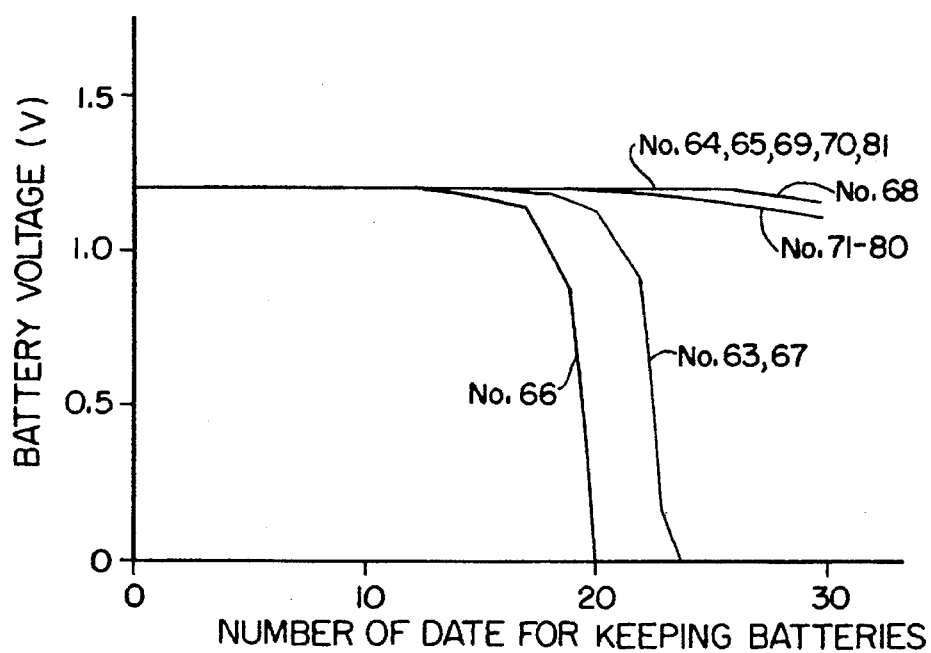
FIG. 16 shows the results for a shelf life test at 65° C. for a storage battery produced by using the hydrogen storing alloy produced in Example 7 of the present invention.

The above-mentioned samples were used to produce enclosed-type nickel-hydrogen storage batteries for the evaluation of the lifetime characteristics thereof at 65° C. as in Example 3. The results are shown in FIG. 16.

In the batteries using Samples 63, 66 and 67, the battery voltages were rapidly decreased after they were kept at 65° C. for about 15 to 20 days. This seems to be for the following reason: In Sample 63, since the content of Ni is small, Al can not prevent alloy components from eluting into the alkaline electrolytic solution; in Sample 66, since the content of Mn is large, Al can not prevent alloy components from eluting into the alkaline electrolytic solution; and in Sample 67, since the content of V is large, Al can not prevent alloy components from eluting into the alkaline electrolytic solution. The other batteries exhibited little decrease in battery voltages even after they were kept for 30 days.

The results of the half cell test and the shelf life test at 65° C. show that the hydrogen storing alloy electrodes according to the present invention have a large discharging capacity and a long lifetime at a high temperature of 65° C., and are excellent in early discharging characteristics.

In this example, the alloy electrodes respectively using samples including Fe or Co as M were evaluated, but similar results were obtained for alloy electrodes using samples including both Fe and Co.

TABLE 7

| Sample No. | Composition |
| --- | --- |
| 63 | $ZrMn_{0.7}V_{0.3}Co_{0.2}Al_{0.03}Ni_{0.9}$ |
| 64 | $ZrMn_{0.4}V_{0.1}Fe_{0.1}Al_{0.03}Ni_{1.6}$ |
| 65 | $ZrMn_{0.3}V_{0.3}Co_{0.1}Al_{0.03}Ni_{1.4}$ |
| 66 | $ZrMn_{0.9}V_{0.2}Fe_{0.1}Al_{0.03}Ni_{1.0}$ |
| 67 | $ZrMn_{0.5}V_{0.4}Co_{0.1}Al_{0.03}Ni_{1.2}$ |
| 68 | $ZrMn_{0.6}V_{0.2}Fe_{0.3}Al_{0.03}Ni_{1.1}$ |
| 69 | $ZrMn_{0.6}V_{0.2}Fe_{0.1}Al_{0.03}Ni_{1.2}$ |
| 70 | $ZrMn_{0.7}V_{0.2}Co_{0.1}Al_{0.03}Ni_{1.1}$ |
| 71 | $ZrMn_{0.7}V_{0.2}Fe_{0.1}Al_{0.03}Ni_{1.1}$ |
| 72 | $ZrMn_{0.7}V_{0.2}Co_{0.2}Al_{0.03}Ni_{1.1}$ |
| 73 | $ZrMn_{0.7}V_{0.2}Fe_{0.2}Al_{0.03}Ni_{1.1}$ |
| 74 | $ZrMn_{0.8}V_{0.2}Co_{0.1}Al_{0.03}Ni_{1.1}$ |
| 75 | $ZrMn_{0.8}V_{0.2}Fe_{0.1}Al_{0.03}Ni_{1.1}$ |
| 76 | $ZrMn_{0.7}V_{0.3}Co_{0.1}Al_{0.03}Ni_{1.1}$ |
| 77 | $ZrMn_{0.7}V_{0.3}Fe_{0.1}Al_{0.03}Ni_{1.1}$ |
| 78 | $ZrMn_{0.5}V_{0.2}Co_{0.1}Al_{0.03}Ni_{1.2}$ |
| 79 | $ZrMn_{0.5}V_{0.2}Fe_{0.1}Al_{0.03}Ni_{1.2}$ |
| 80 | $ZrMn_{0.4}V_{0.2}Co_{0.2}Al_{0.03}Ni_{1.3}$ |
| 81 | $ZrMn_{0.4}V_{0.2}Fe_{0.2}Al_{0.03}Ni_{1.3}$ |

(Example 8)

Sample alloys represented by the formula $ZrMn_{0.6}V_{0.2}Co_{0.1}W_uNi_{1.2}$ (wherein $0.01 \leq u \leq 0.3$), respectively having different compositions as listed in Table 8, were produced in the same manner as in Example 1. In this example, W and Co were used instead of Al as the starting materials.

Samples 82 to 84 are examples of the hydrogen storing alloy used in the present invention and Sample 57 is a conventional alloy including no W. Samples 85 to 87 are reference examples having a larger u, the mole ratio of W to Zr (i.e., u=0.15 in Sample 85, u=0.2 in Sample 86 and u=0.3 in Sample 87).

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15 -type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. The crystal lattice constants decreased as u, the mole ratio of W to Zr, increased, and were within the range of 7.04 to 7.10 angstroms in all the obtained samples.

Next, in the measurement of the PCT characteristics at 70° C., all the samples had almost the same hydrogenation characteristics, but the samples having a u, the mole ratio of W to Zr, of more than 0.1 had a small decreased amount of the hydrogen absorbing capacity. Moreover, a heat treatment in vacuum made the plateau region in the PCT diagram longer, resulting in increasing the amount of hydrogen to be absorbed by or desorbed from the alloy.

2. A Half Cell Test

A half cell test was performed on each of the above-mentioned alloy samples in the same manner as in Example 2. The results are shown in FIG. 17.

Figure 17:
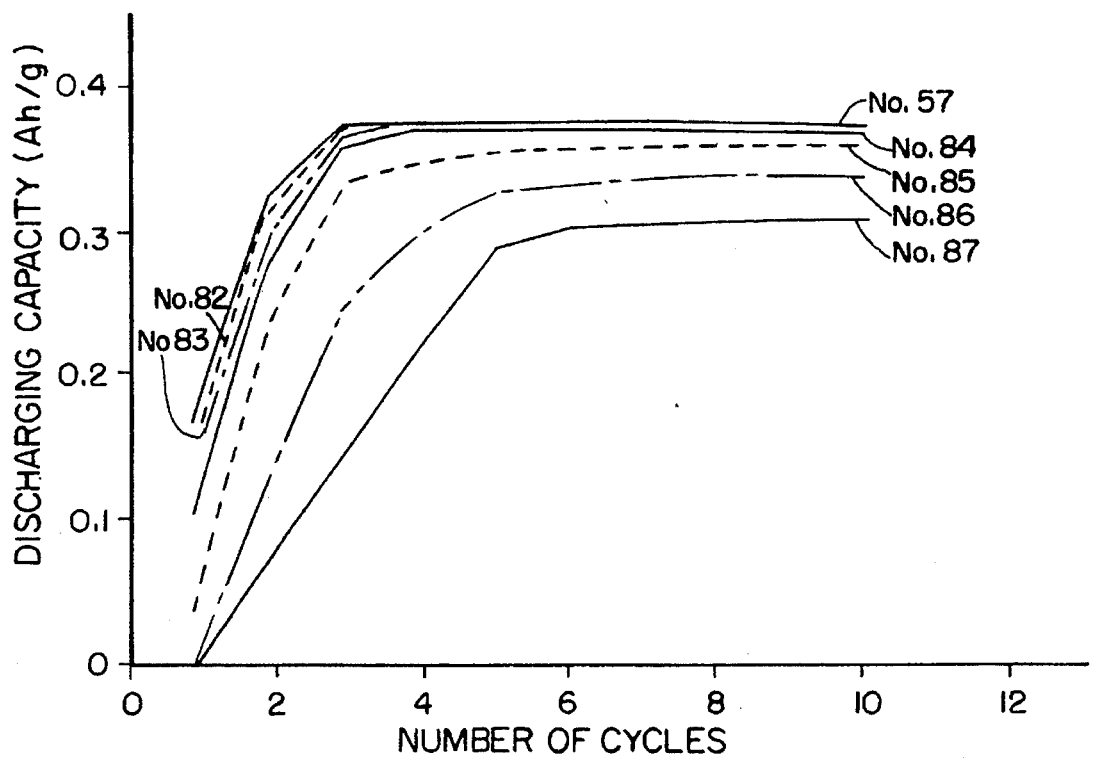
FIG. 17 shows the test results for a half cell produced by using a hydrogen storing alloy produced in Example 8 of the present invention.

The results shown in FIG. 17 indicate that the early discharging characteristics are degraded as u, the mole ratio of W to Zr, increases. The cells using Samples 85 to 87 had a discharging capacity in the first cycles 50% or less of that of Sample 57 including no W. On the contrary, the cells using Samples 82 to 84 had a discharging capacity in the first cycles about 70% of that of Sample 57 including no W. This proved that the early discharging characteristics are not largely degraded in the half cell according to the present invention.

3. Shelf Life Test of Enclosed-type Nickel-Hydrogen Storage Battery

Figure 18:
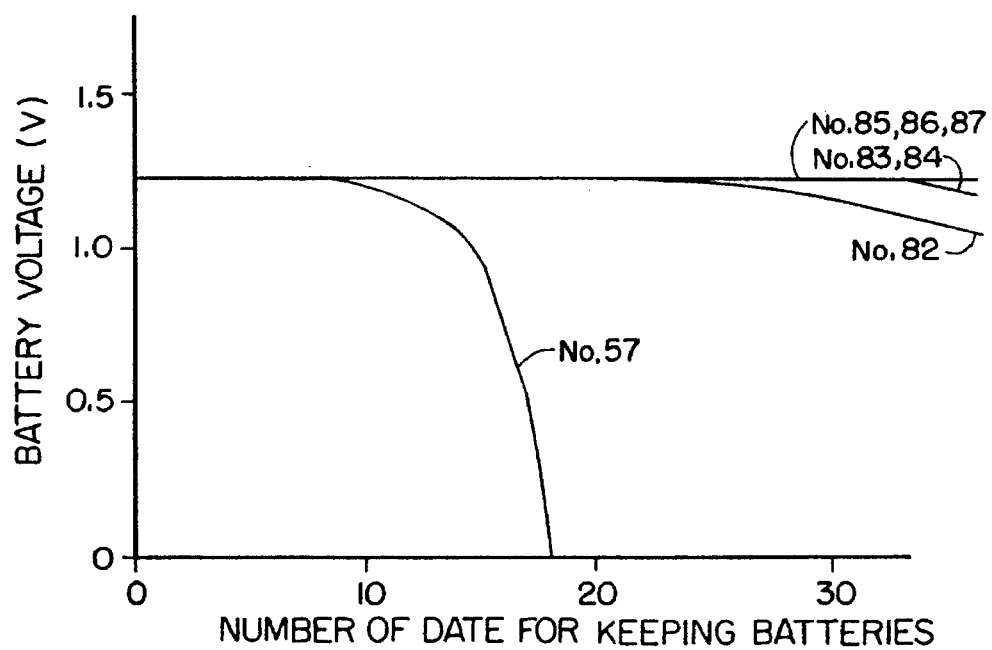
FIG. 18 shows the results for a shelf life test at 65° C. for a storage battery produced by using the hydrogen storing alloy produced in Example 8 of the present invention.

The above-mentioned samples were used to produced enclosed-type nickel-hydrogen storage batteries for the evaluation of the lifetime characteristics thereof at 65° C. as in Example 2. The results are shown in FIG. 18.

In the battery using Sample 57, that is, a conventional alloy, the battery voltage was rapidly decreased after it was kept at 65° C. for more than 10 days. In the batteries using Samples 82 to 87 including W, the battery voltages were little decreased even after they were kept for 30 days.

These results show that a hydrogen storing alloy electrode including W in the mole ratio to Zr in the range of 0.01 to 0.1 has a long lifetime at a high temperature of 65° C., while it still has a high discharging capacity and the early discharging characteristics almost identical to those of a hydrogen storing alloy electrode including no W. This seems to be because W prevents the alloy compositions from eluting into the alkaline electrolytic solution. However, since W also has an effect to degrade the electrochemical activity in the early charging and discharging cycles, the early discharging characteristics are degraded as the content of W increases. But this effect of W is not much affected if u, the mole ratio of W to Zr, is 0.1 or less.

TABLE 8

| Sample No. | Composition |
| --- | --- |
| 57 | $ZrMn_{0.6}V_{0.2}Co_{0.1}Ni_{1.2}$ |
| 82 | $ZrMn_{0.6}V_{0.2}Co_{0.1}W_{0.01}Ni_{1.2}$ |
| 83 | $ZrMn_{0.6}V_{0.2}Co_{0.1}W_{0.05}Ni_{1.2}$ |
| 84 | $ZrMn_{0.6}V_{0.2}Co_{0.1}W_{0.1}Ni_{1.2}$ |
| 85 | $ZrMn_{0.6}V_{0.2}Co_{0.1}W_{0.15}Ni_{1.2}$ |
| 86 | $ZrMn_{0.6}V_{0.2}Co_{0.1}W_{0.2}Ni_{1.2}$ |
| 87 | $ZrMn_{0.6}V_{0.2}Co_{0.1}W_{0.3}Ni_{1.2}$ |

(Example 9)

Samples alloys respectively having different compositions as listed in Table 9 were produced in the same manner as in Example 1 except that Fe or Co was further used and W was used instead of Al as the starting materials. In all the samples, u, the mole ratio of W to Zr, was 0.03. In the production of samples having an m, the mole ratio of Mn to Zr, of 0.8 or more, an induction heater was used instead of the arc melting furnace as in Example 2.

Samples 94 to 106 are examples of the hydrogen storing alloy used in the present invention and Samples 88 to 93 are reference examples.

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15 -type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. Especially, even samples having an m, the mole ratio of Mn to Zr, of 0.8 or more had homogeneous compositions. The crystal lattice constants were within the range of 7.03 to 7.10 angstroms in all the obtained samples except for Sample 89, which had a crystal lattice constant of smaller than 7.03 angstroms.

Next, in the measurement of the PCT characteristics at 70° C., all the samples had almost the same hydrogenation characteristics except that Samples 89 and 93 exhibited a high hydrogen equilibrium pressure, and Samples 90 and 92 had a short plateau region in the PCT diagram. The other samples had a hydrogen absorbing capacity of 1.0 to 1.2 (H/M), which was about 10 to 20% larger than that of Sample 89, 90, 92 or 93. Moreover, a heat treatment in vacuum made the plateau region in the PCT diagram longer, resulting in increasing the amount of hydrogen to be absorbed by or desorbed from the alloy. This also applied to alloys including no W, which proved that the hydrogenation characteristics of an alloy including W in the mole ratio of Zr of 0.03 were almost equal to those of an alloy including no W.

2. A Half Cell Test

Figure 19:
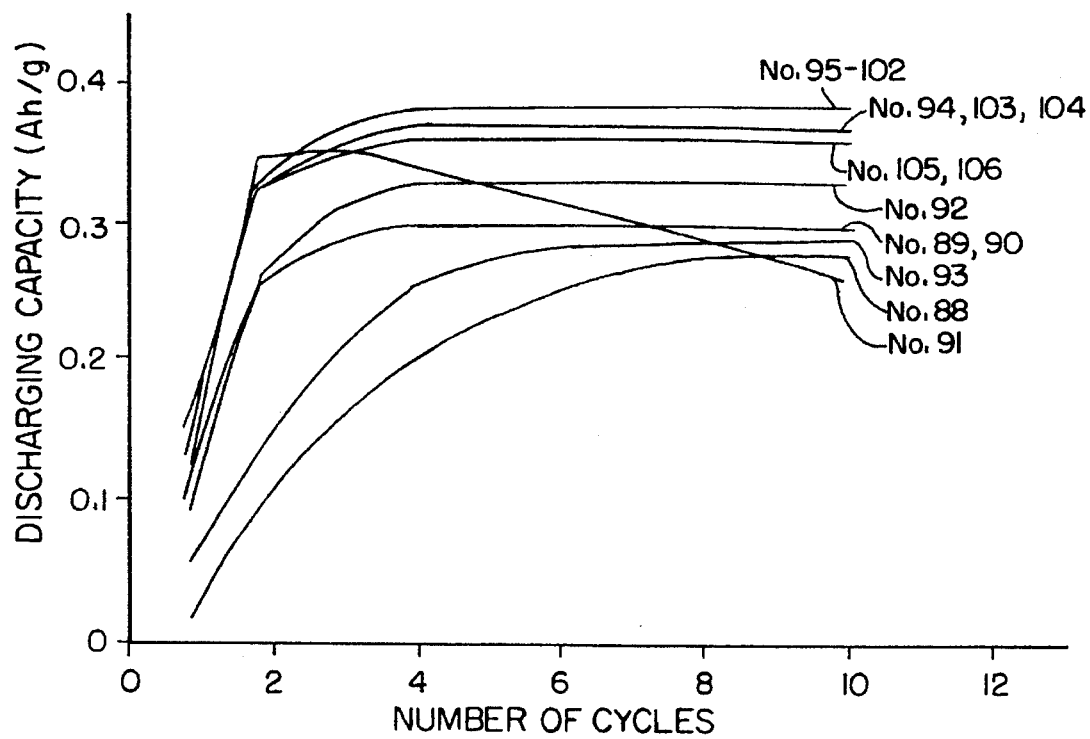
FIG. 19 shows the test results for a half cell produced by using a hydrogen storing alloy produced in Example 9 of the present invention.

A half cell test was performed on each of the above-mentioned alloy samples in the same manner as in Example 2. The results are shown in FIG. 19.

The early discharging characteristics were excellent in all the half cells, and W did not seem to cause degradation of the electrochemical activity in the early charging and discharging cycles. However, the cells using Samples 89, 90, 92 and 93, which had a small hydrogen absorbing capacity, had a small saturation discharging capacity. The cell using Sample 88, which had only a small amount of Ni, was low in electrochemical activity, and had a small saturation discharging capacity. In the cell using Sample 91, whcih had a comparatively large amount of Mn, a large amount of Mn was eluted into the alkaline electrolytic solution, thereby decreasing the discharging capacity largely after a number of charging and discharging cycles. On the contrary, the cells using Samples 94 to 106, which are the hydrogen storing alloy electrodes according to the present invention, exhibited little decrease in the saturation discharging capacity although they included W. Moreover, these electrodes had a large early discharging capacity and had a large saturation discharging capacity of 0.34 to 0.37 Ah/g.

3. Shelf Life Test of Enclosed-type Nickel-Hydrogen Storage Batteries

Figure 20:
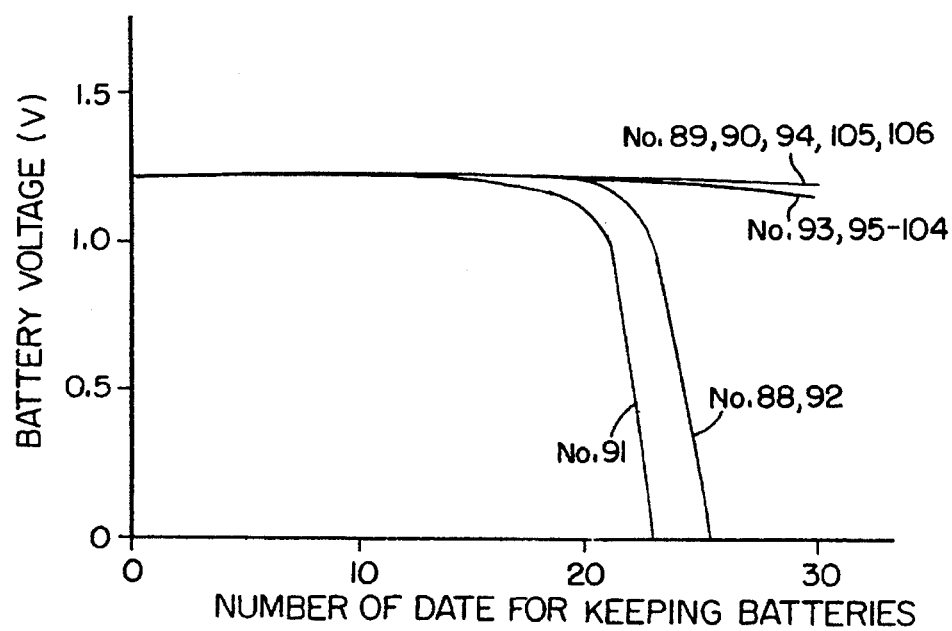
FIG. 20 shows the results for a shelf life test at 65° C. for a storage battery produced by using the hydrogen storing alloy produced in Example 9 of the present invention.

The above-mentioned samples were used to produced enclosed-type nickel-hydrogen storage batteries for the evaluation of the lifetime characteristics thereof at 65° C. as in Example 2. The results are shown in FIG. 20.

In the batteries using Samples 88, 91 and 92, the battery voltages were rapidly decreased after they were kept for about 10 to 20 days. This seems to be for the following reason: In Sample 88, since the content of Ni is small, W can not prevent alloy components from eluting into the alkaline electrolytic solution; in Sample 91, since the content of Mn is large, W can not prevent alloy components from eluting into the alkaline electrolytic solution; and in Sample 92, since the content of V is large, W can not prevent alloy components from eluting into the alkaline electrolytic solution. The other batteries exhibited little decrease in the battery voltages even after they were kept at 65° C. for 30 days.

The results of the half cell test and the shelf life test at 65° C. show that the hydrogen storing alloy electrodes according to the present invention have a large discharging capacity and a long lifetime at a high temperature of 65° C. and are excellent in early discharging characteristics.

In this example, the alloy electrodes respectively using samples including Fe or Co as M were evaluated, but similar results were obtained for alloy electrodes using samples including both Fe and Co.

TABLE 9

| Sample No. | Composition |
|---|---|
| 88 | $ZrMn_{0.7}V_{0.3}Co_{0.2}W_{0.03}Ni_{0.9}$ |
| 89 | $ZrMn_{0.4}V_{0.1}Fe_{0.1}W_{0.03}Ni_{1.6}$ |
| 90 | $ZrMn_{0.3}V_{0.3}Co_{0.1}W_{0.03}Ni_{1.4}$ |
| 91 | $ZrMn_{0.9}V_{0.2}Fe_{0.1}W_{0.03}Ni_{1.0}$ |

TABLE 9-continued

| Sample No. | Composition |
|---|---|
| 92 | $ZrMn_{0.5}V_{0.4}Co_{0.1}W_{0.03}Ni_{1.2}$ |
| 93 | $ZrMn_{0.6}V_{0.2}Fe_{0.3}W_{0.03}Ni_{1.1}$ |
| 94 | $ZrMn_{0.6}V_{0.2}Fe_{0.1}W_{0.03}Ni_{1.2}$ |
| 95 | $ZrMn_{0.7}V_{0.2}Co_{0.1}W_{0.03}Ni_{1.1}$ |
| 96 | $ZrMn_{0.7}V_{0.2}Fe_{0.1}W_{0.03}Ni_{1.1}$ |
| 97 | $ZrMn_{0.7}V_{0.2}Co_{0.2}W_{0.03}Ni_{1.1}$ |
| 98 | $ZrMn_{0.7}V_{0.2}Fe_{0.2}W_{0.03}Ni_{1.1}$ |
| 99 | $ZrMn_{0.8}V_{0.2}Co_{0.1}W_{0.03}Ni_{1.1}$ |
| 100 | $ZrMn_{0.8}V_{0.2}Fe_{0.1}W_{0.03}Ni_{1.1}$ |
| 101 | $ZrMn_{0.7}V_{0.3}Co_{0.1}W_{0.03}Ni_{1.1}$ |
| 102 | $ZrMn_{0.7}V_{0.3}Fe_{0.1}W_{0.03}Ni_{1.1}$ |
| 103 | $ZrMn_{0.5}V_{0.2}Co_{0.1}W_{0.03}Ni_{1.2}$ |
| 104 | $ZrMn_{0.5}V_{0.2}Fe_{0.1}W_{0.03}Ni_{1.2}$ |
| 105 | $ZrMn_{0.4}V_{0.2}Co_{0.2}W_{0.03}Ni_{1.3}$ |
| 106 | $ZrMn_{0.4}V_{0.2}Fe_{0.2}W_{0.03}Ni_{1.3}$ |

(Example 10)

Sample alloys represented by the formula $ZrMn_{0.6}V_{0.2}Co_{0.1}Zn_uNi_{1.2}$, respectively having different compositions as listed in Table 10, were produced in the same manner as in Example 1. In this example, Zn and Co were used instead of Al as the starting materials.

Samples 107 to 111 are examples of the hydrogen storing alloy used in the present invention. Sample 57 is a conventional alloy including no Zn and Samples 112 and 113 are reference examples having a larger u, the mole ratio of Zn to Zr (i.e., u=0.23 in Sample 112 and u=0.32 in Sample 113).

1. Evaluation of Physicochemical Characteristics of Hydrogen Storage Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15 -type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. The crystal lattice constants decreased as u, the mole ratio of Zn to Zr, increased, and were within the range of 7.04 to 7.07 angstroms in all the obtained samples.

Next, in the measurement of the PCT characteristics at 70° C., all the samples had almost the same hydrogenation characteristics, but the samples having a u, the mole ratio of Zn to Zr, of 0.16 or more had a small decreased amount of hydrogen absorbing capacity. Moreover, a heat treatment in vacuum made the plateau region in the PCT diagram longer, resulting in increasing the amount of hydrogen to be absorbed by or desorbed from the alloy.

2. A Half Cell Test

A half cell test was performed on each of the above-mentioned alloy samples in the same manner as in Example 1. The results are shown in FIG. 21.

Figure 21:
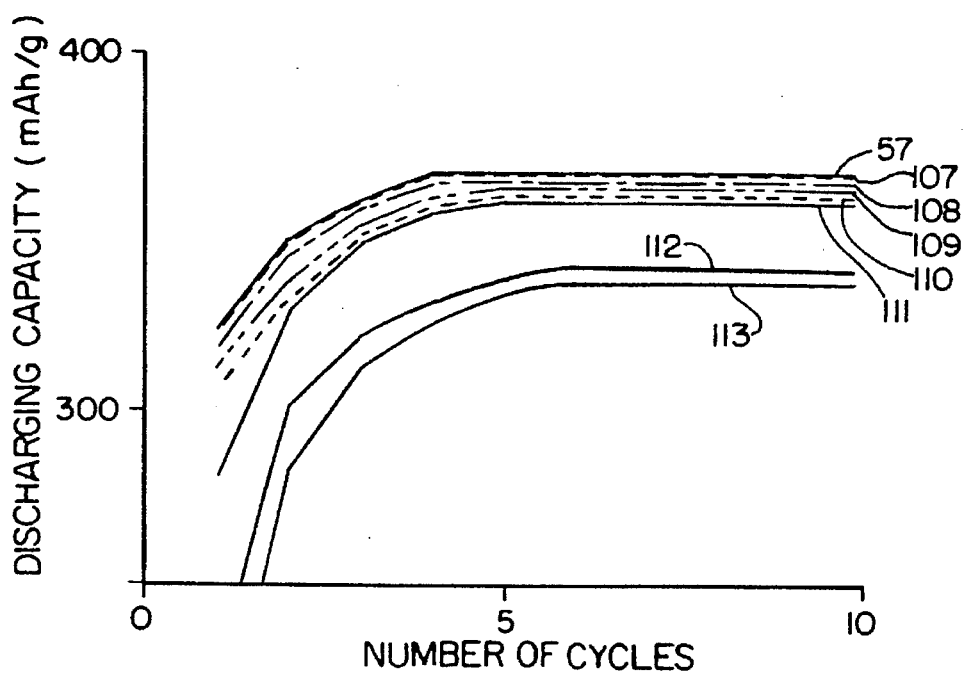
FIG. 21 shows the test results for a half cell produced by using a hydrogen storing alloy produced in Example 10 of the present invention.

The results shown in FIG. 21 indicate that the early discharging characteristics are degraded as u, the mole ratio of Zn to Zr, increases. The cells using Samples 112 and 113 had a discharging capacity in the first cycles 50% or less of that of Sample 57 including no Zn. On the contrary, the cells using Samples 107 to 111 had a discharging capacity in the first cycles 70% or more of that of Sample 57 including no Zn. This proved that the early discharging characteristics are not largely degraded in the cells according to the present invention.

3. Shelf Life Test of Enclosed-type Nickel-Hydrogen Storage Batteries

Figure 22:
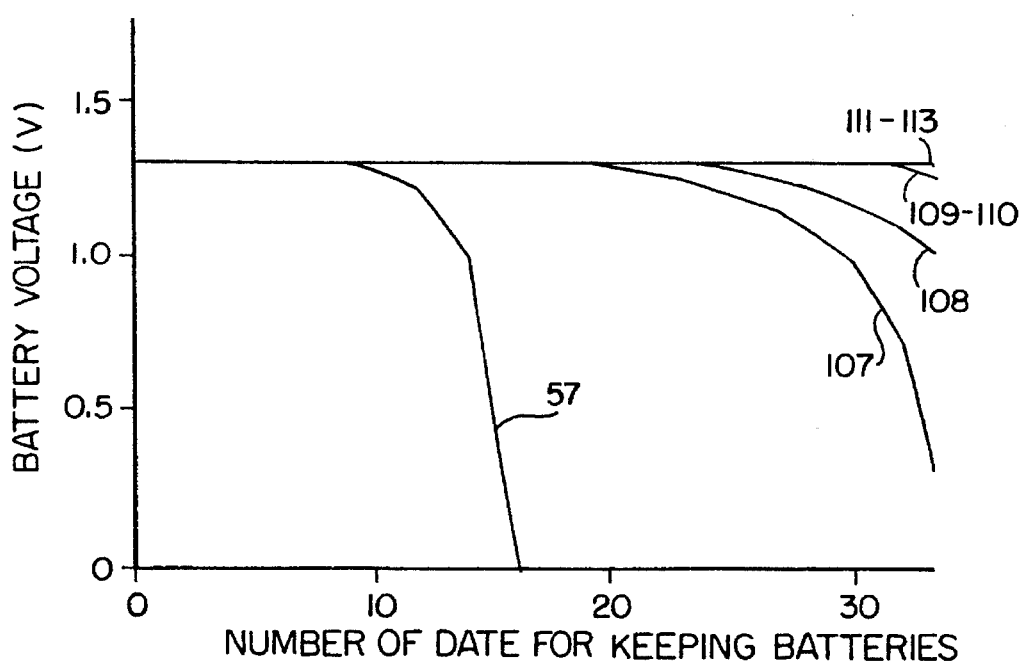
FIG. 22 shows the results for a shelf life test at 65° C. for a storage battery produced by using the hydrogen storing alloy produced in Example 10 of the present invention.

The above-mentioned samples were used to produced enclosed-type nickel-hydrogen storage batteries for the evaluation of the lifetime characteristics thereof at 65° C. as in Example 1. The results are shown in FIG. 22.

In the battery using Sample 57, that is, a conventional alloy, the battery voltage was rapidly decreased after it was kept at 65° C. for more than 10 to 20 days. In the batteries using Samples 107 to 113 including Zn, the battery voltages were little decreased even after they were kept for 30 days.

Figure 23:
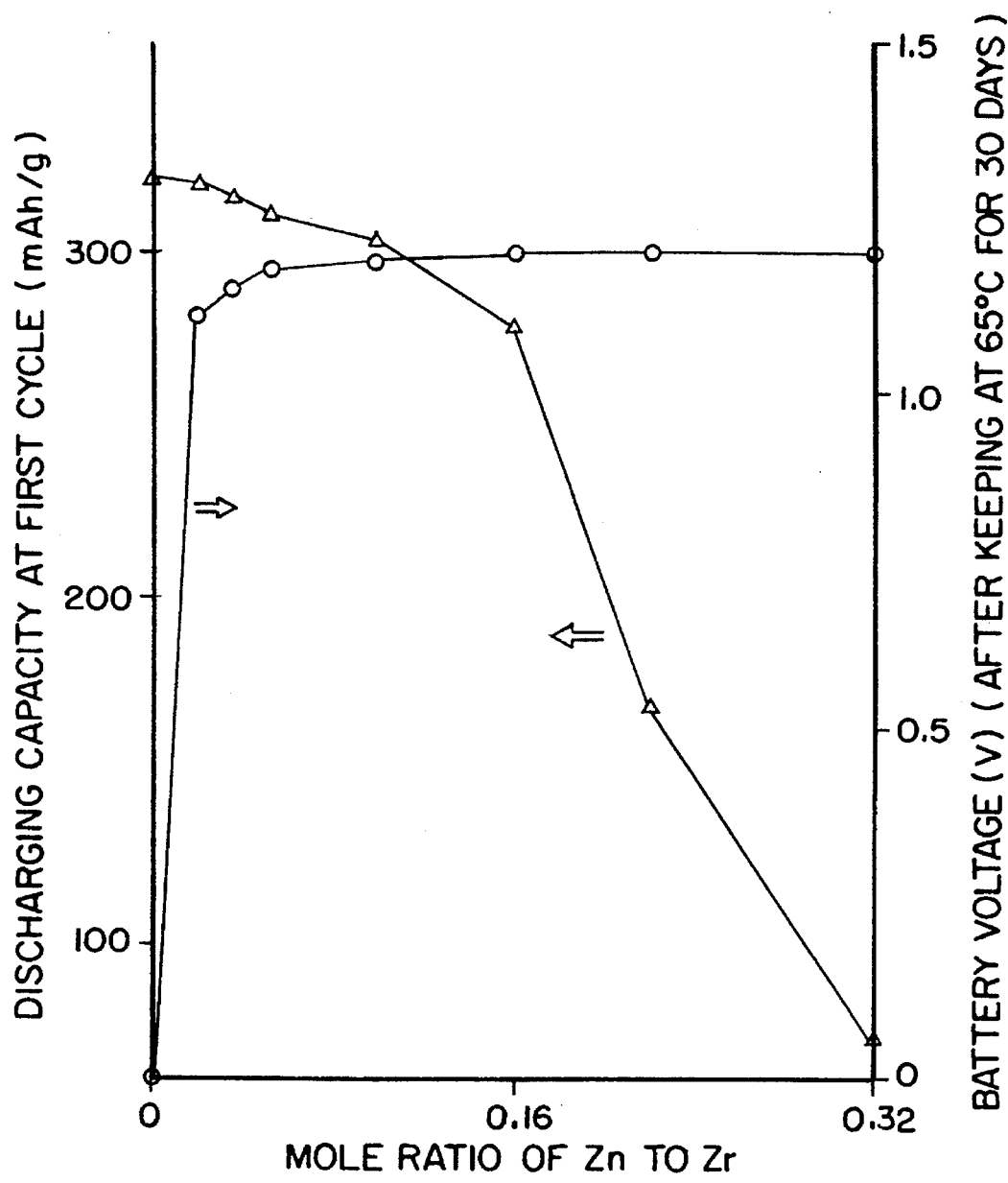
FIG. 23 is a graph obtained from the results shown in FIGS. 21 and 22 in order to find the optimum content of Zn in the hydrogen storing alloy produced in Example 10 of the present invention.

The results of the half cell test and the shelf life test at 65° C. of the storage batteries are combined in FIG. 23. The abscissa indicates the mole ratio of Zn to Zr, the left ordinate indicates the discharging capacity of a half cell (mAh/g) and the right ordinate indicates the battery voltage (V) after keeping the batteries at 65° C. for 30 days. The plot shown with Δ indicates a change in the discharging capacity in the first cycle in the half cell test. The plot shown with o indicates a change in the battery voltage after keeping the batteries at 65° C. for 30 days.

FIG. 23 shows that a hydrogen storing alloy electrode including Zn in the mole ratio to Zr in the range of 0.02 to 0.18 has a long lifetime at a high temperature of 65° C., while it is still excellent in early discharging characteristics and has a maximum discharging capacity almost identical to that of a hydrogen storing alloy electrode including no Zn. This is because Zn can prevent the other alloy compositions from eluting into the alkaline electrolytic solution. However, since Zn also has an effect to degrade the electrochemical activity in the early charging and discharging cycles, the early discharging characteristics are degraded as the content of Zn increases. But this effect of Zn is not much effected if u, the mole ratio of Zn to Zr, is in the range of 0.02 to 0.18.

TABLE 10

| Sample No. | Composition |
| --- | --- |
| 57 | $ZrMn_{0.6}V_{0.2}Co_{0.1}Ni_{1.2}$ |
| 107 | $ZrMn_{0.6}V_{0.2}Co_{0.1}Zn_{0.016}Ni_{1.2}$ |
| 108 | $ZrMn_{0.6}V_{0.2}Co_{0.1}Zn_{0.032}Ni_{1.2}$ |
| 109 | $ZrMn_{0.6}V_{0.2}Co_{0.1}Zn_{0.048}Ni_{1.2}$ |
| 110 | $ZrMn_{0.6}V_{0.2}Co_{0.1}Zn_{0.097}Ni_{1.2}$ |
| 111 | $ZrMn_{0.6}V_{0.2}Co_{0.1}Zn_{0.16}Ni_{1.2}$ |
| 112 | $ZrMn_{0.6}V_{0.2}Co_{0.1}Zn_{0.23}Ni_{1.2}$ |
| 113 | $ZrMn_{0.6}V_{0.2}Co_{0.1}Zn_{0.32}Ni_{1.2}$ |

(Example 11)

Sample alloys respectively having different compositions as listed in Table 11 were produced in the same manner as in Example 1 except that Zn was used instead of Al, and Fe, Co or Cr was further used as the starting materials. In all the samples, u, the mole ratio of Zn to Zr, was 0.05. In the production of samples having an m, the mole ratio of Mn to Zr, of 0.8 or more, an induction heater was used instead of the arc melting furnace as in Example 2.

Samples 120 to 132 are examples of the hydrogen storing alloy used in the present invention and Samples 114 to 119 are reference examples.

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15-type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. Especially, even samples having an m, the mole ratio of Mn to Zr, of 0.8 or more had homogeneous compositions. The crystal lattice constants were within the range of 7.03 to 7.10 angstroms in all the obtained samples except for Sample 115, which had a crystal lattice constant of smaller than 7.03 angstroms.

Next, in the measurement of the PCT characteristics at 70° C., all the samples had almost the same hydrogenation characteristics except that Samples 115 and 116 exhibited a high hydrogen equilibrium pressure, and Samples 116 and 118 had a short plateau region in the PCT diagram. The other samples had a hydrogen absorbing capacity of 1.0 to 1.2 (H/M), which was about 10 to 20% larger than that of Sample 115, 116, 118 or 119. Moreover, a heat treatment in vacuum made the plateau region in the PCT diagram longer, resulting in increasing the amount of hydrogen to be absorbed by or desorbed from the alloy. This also applied to alloys including no Zn, which proved that the hydrogenation characteristics of an alloy including Zn in the mole ratio to Zr of 0.5 were almost equal to those of an alloy including no Zn.

2. A Half Cell Test

Figure 24:
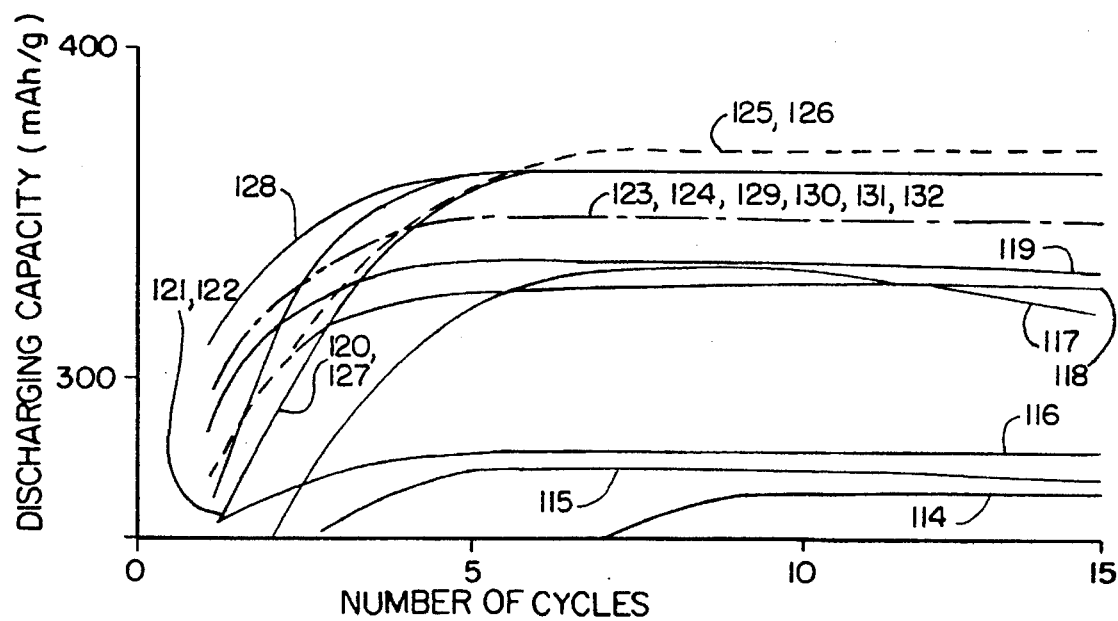
FIG. 24 shows the test results for a half cell produced by using a hydrogen storing alloy produced in Example 11 of the present invention.

A half cell test was performed on each of the above-mentioned alloy samples in the same manner as in Example 1. The results are shown in FIG. 24.

The early discharging characteristics were excellent in all the half cells, and Zn did not seem to cause degradation of the electrochemical activity in the early charging and discharging cycles. However, the cells using Samples 115, 116, 118 and 119, which had a small hydrogen absorbing capacity, had a small saturation discharging capacity. In the cell using Sample 114, which had only a small amount of Ni, was low in the electrochemical activity, and had a small saturation discharging capacity. In the cell using Sample 117, which had a comparatively large amount of Mn, a large amount of Mn was eluted into the alkaline electrolytic solution, thereby decreasing the discharging capacity in large after a repetition of charging and discharging cycles. On the contrary, cells using Samples 120 to 132, which are hydrogen storing alloy electrodes according to the present invention, exhibited little decrease in the saturation discharging capacity although they included Zn. Moreover, these cells are excellent in the early discharging characteristics and had a large saturation discharging capacity of 0.34 to 0.37 Ah/g.

3. Shelf Life Test of Enclosed-type Nickel-Hydrogen Storage Batteries

Figure 25:
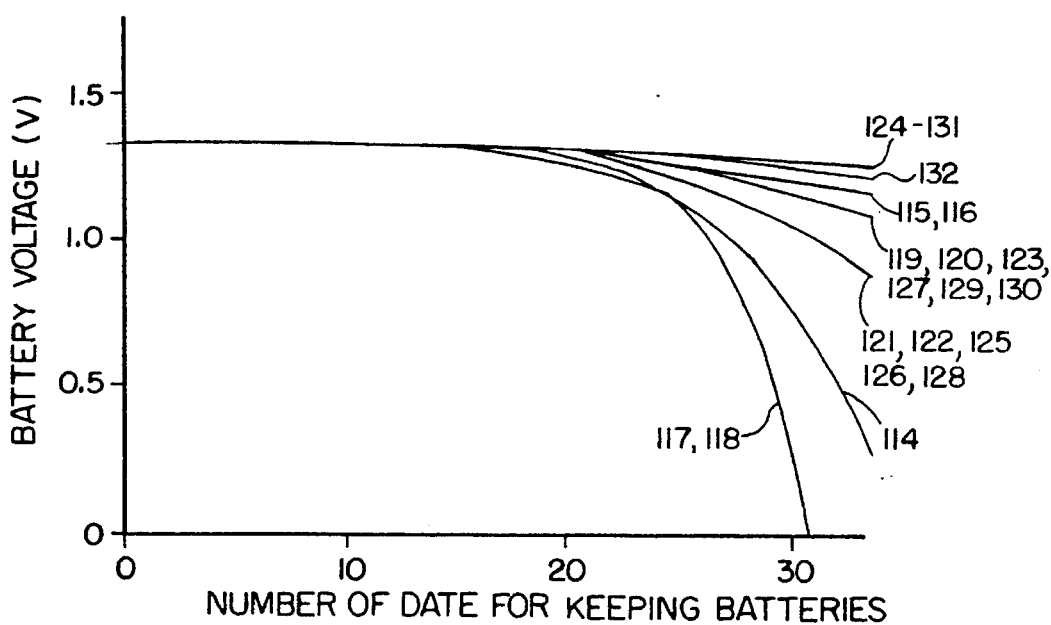
FIG. 25 shows the results for a shelf life test at 65° C. of a storage battery produced by using the hydrogen storing alloy produced in Example 11 of the present invention.

The above-mentioned samples were used to produce enclosed-type nickel-hydrogen storage batteries for the evaluation of the lifetime characteristics thereof at 65° C. as in Example 1. The results are shown in FIG. 25.

In the batteries using Samples 114, 117 and 118, the battery voltages were rapidly decreased after they were kept at 65° C. for about 10 to 20 days. This seems to be for the following reason: In Sample 114, since the content of Ni is small, Zn can not prevent alloy components from eluting into the alkaline electrolytic solution; in Sample 117, since the content of Mn is large, Zn can not prevent alloy components from eluting into the alkaline electrolytic solution; and in Sample 118, since the content of V is large, Zn can not prevent alloy components from eluting into the alkaline electrolytic solution. The other batteries exhibited little decrease in the battery voltages even after they were kept for 30 days.

The results of the half cell test and the shelf life test at 65° C. show the following: In the batteries using Samples 114, 117 and 118, Zn provided a long lifetime at a high temperature. But only the hydrogen storing alloy electrodes according to the present invention had a larger discharging capacity, and are excellent in the early discharging characteristics.

Moreover, the similar half cell test and shelf life test at 65° C. were performed using alloys including Zn in the mole ratio to Zr of 0.02 to 0.18 to obtain similar results.

TABLE 11

| Sample No. | Composition |
|---|---|
| 114 | $ZrMn_{0.7}V_{0.3}Cr_{0.2}Zn_{0.05}Ni_{0.9}$ |
| 115 | $ZrMn_{0.4}V_{0.1}Fe_{0.1}Zn_{0.05}Ni_{1.6}$ |
| 116 | $ZrMn_{0.3}V_{0.3}Co_{0.1}Zn_{0.05}Ni_{1.4}$ |
| 117 | $ZrMn_{0.9}V_{0.2}Cr_{0.1}Zn_{0.05}Ni_{1.0}$ |
| 118 | $ZrMn_{0.5}V_{0.4}Co_{0.1}Zn_{0.05}Ni_{1.2}$ |
| 119 | $ZrMn_{0.6}V_{0.2}Fe_{0.3}Zn_{0.05}Ni_{1.1}$ |
| 120 | $ZrMn_{0.6}V_{0.2}Cr_{0.1}Zn_{0.05}Ni_{1.2}$ |
| 121 | $ZrMn_{0.7}V_{0.2}Co_{0.1}Zn_{0.05}Ni_{1.1}$ |
| 122 | $ZrMn_{0.7}V_{0.2}Fe_{0.1}Zn_{0.05}Ni_{1.1}$ |
| 123 | $ZrMn_{0.7}V_{0.2}Co_{0.2}Zn_{0.05}Ni_{1.1}$ |
| 124 | $ZrMn_{0.7}V_{0.2}Cr_{0.2}Zn_{0.05}Ni_{1.1}$ |
| 125 | $ZrMn_{0.8}V_{0.2}Co_{0.1}Zn_{0.05}Ni_{1.1}$ |
| 126 | $ZrMn_{0.8}V_{0.2}Fe_{0.1}Zn_{0.05}Ni_{1.1}$ |
| 127 | $ZrMn_{0.7}V_{0.3}Cr_{0.1}Zn_{0.05}Ni_{1.1}$ |
| 128 | $ZrMn_{0.7}V_{0.3}Fe_{0.1}Zn_{0.05}Ni_{1.1}$ |
| 129 | $ZrMn_{0.5}V_{0.2}Co_{0.1}Zn_{0.05}Ni_{1.2}$ |
| 130 | $ZrMn_{0.5}V_{0.2}Cr_{0.1}Zn_{0.05}Ni_{1.2}$ |
| 131 | $ZrMn_{0.4}V_{0.2}Cr_{0.2}Zn_{0.05}Ni_{1.3}$ |
| 132 | $ZrMn_{0.4}V_{0.2}Fe_{0.2}Zn_{0.05}Ni_{1.3}$ |

(Example 12)

Sample alloys represented by the formula $ZrMn0.6V_{0.2}Co_{0.1}Cr_wNi_{1.2}$, respectively having different compositions as listed in Table 12, were produced in the same manner as in Example 1. In this example, Cr and Co were used instead of Al as the starting materials.

Samples 133 to 136 are examples of the hydrogen storing alloy used in the present invention, Sample 57 is a conventional alloy and Samples 137 and 138 are reference examples having a larger w, the mole ratio of Cr to Zr (i.e., w=0.1 in Sample 137 and w=0.12 in Sample 138).

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15-type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. The crystal lattice constants decreased as w, the mole ratio of Cr to Zr, increased, and were within the range of 7.04 to 7.07 angstroms in all the obtained samples.

Next, in the measurement of the PCT characteristics at 70° C., all the samples had almost the same hydrogenation characteristics, but the samples having w, the mole ratio of Cr to Zr, of 0.08 or more had a small decreased amount of hydrogen absorbing capacity. Moreover, a heat treatment in vacuum made the plateau region in the PCT diagram longer, resulting in increasing the amount of hydrogen to be absorbed by or desorbed from the alloy.

2. A Half Cell Test

A half cell test was performed on each of the above-mentioned alloy samples in the same manner as in Example 1. The results are shown in FIG. 26.

Figure 26:
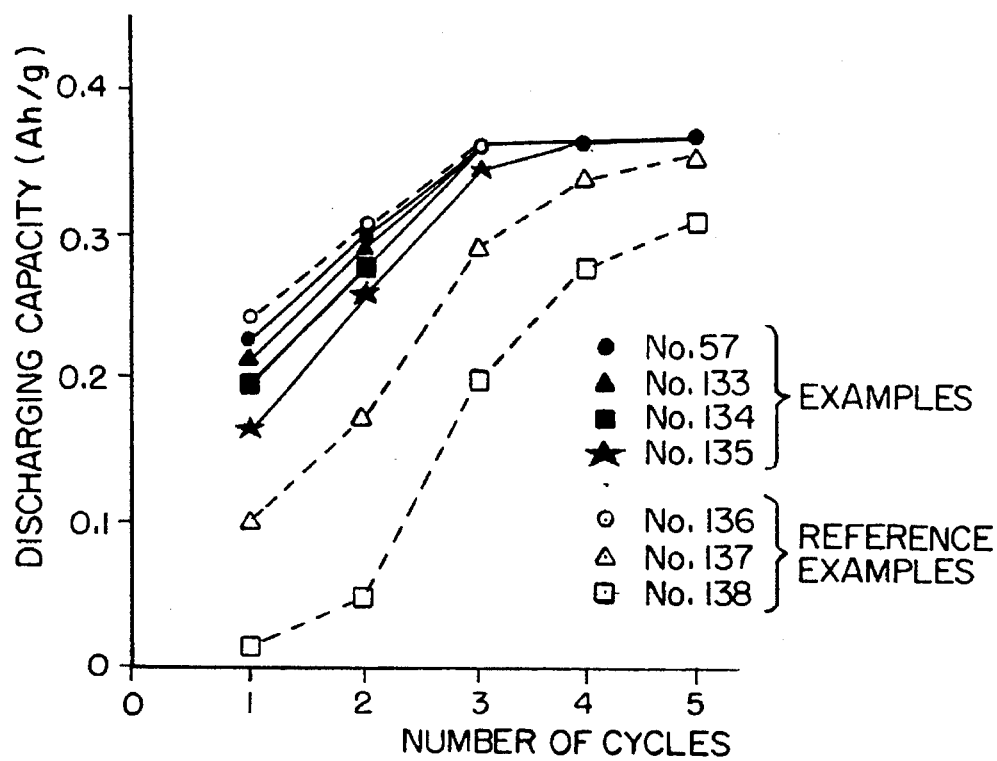
FIG. 26 shows the test results for a half cell produced by using a hydrogen storing alloy produced in Example 12 of the present invention.

The results shown in FIG. 26 indicate that the early discharging characteristics are degraded as w, the mole ratio of Cr to Zr, increases. The cells using Samples 137 and 138 had a discharging capacity in the first cycles 50% or less of that of Sample 57 including no Cr. On the contrary, the cells using Samples 133 to 136 had a discharging capacity in the first cycles 70% or more of that of Sample 57 including no Cr. This proved that the early discharging characteristics are not largely degraded in the cells according to the present invention.

3. Shelf Life Test of Enclosed-type Nickel-Hydrogen Storage Batteries

Figure 27:
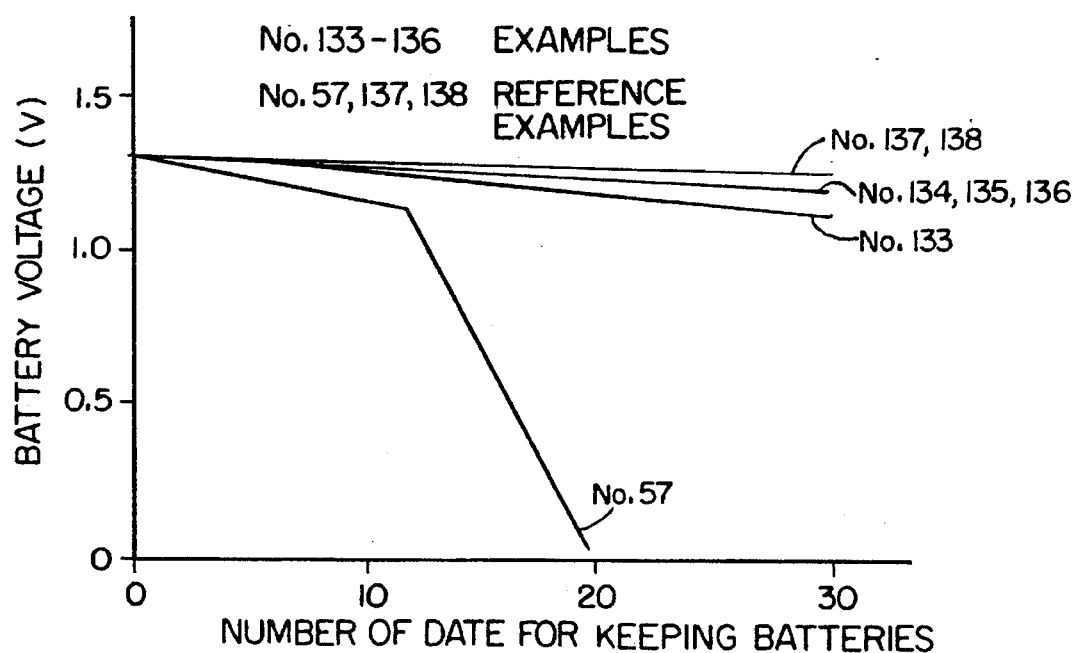
FIG. 27 shows the results for a shelf life test at 65° C. of a storage battery produced by using the hydrogen storing alloy produced in Example 12 of the present invention.

The above-mentioned samples were used to produce enclosed-type nickel-hydrogen storage batteries for the evaluation of the lifetime characteristics thereof at 65° C. as in Example 1. The results are shown in FIG. 27.

In the battery using Sample 57, that is, a conventional alloy, the battery voltage was rapidly decreased after it was kept at 65° C. for more than 10 days. In the batteries using Samples 133 to 138 including Cr, the battery voltages were little decreased even after they were kept for 30 days.

Figure 28:
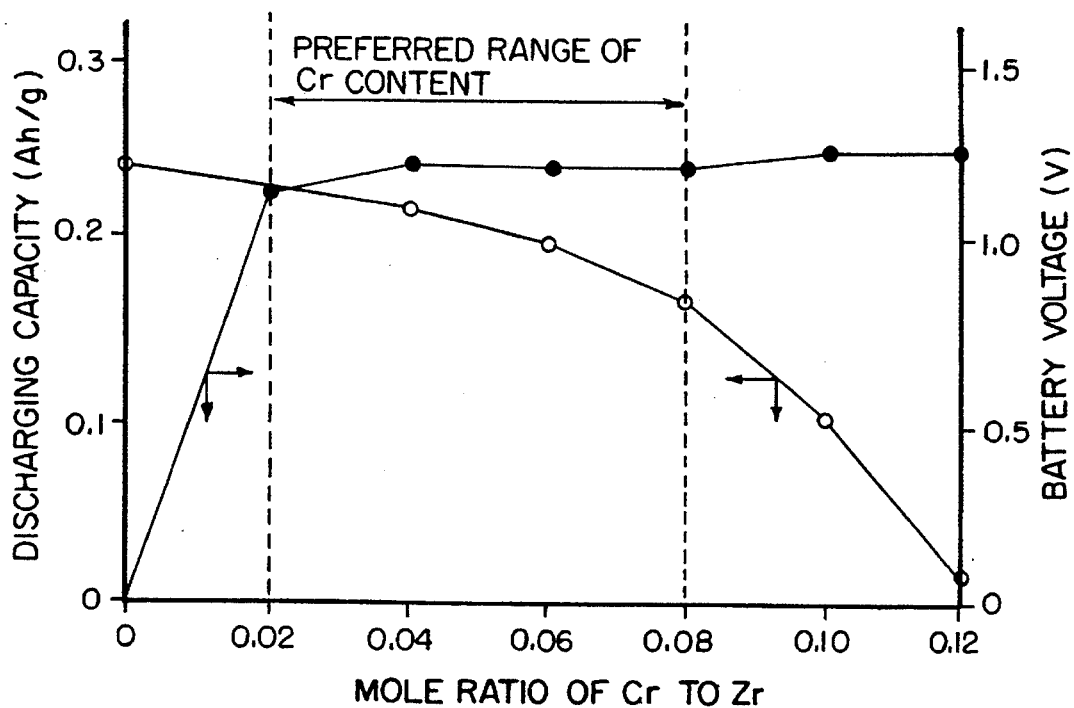
FIG. 28 is a graph obtained from the results shown in FIGS. 26 and 27 in order to find the optimum content of Cr in the hydrogen storing alloy produced in Example 12 of the present invention.

The results of the half cell test and the shelf life test at 65° C. of the storage batteries are combined in FIG. 28. The abscissa indicates the mole ratio of Cr to Zr, the left ordinate indicates the discharging capacity of a half cell (Ah/g) in the first cycle and the right ordinate indicates the battery voltage (V) after keeping the batteries at 65° C. for 30 days. The plot shown with o indicates a change in the discharging capacity in the first cycle in the half cell test. The plot shown with ● indicates a change in the battery voltage after keeping the batteries at 65° C. for 30 days.

FIG. 28 shows that a hydrogen storing alloy electrode including Cr in the mole ratio to Zr in the range of 0.02 to 0.08 has a long lifetime at a high temperature of 65° C., while it is still excellent in early discharging characteristics and still has maximum discharging capacity almost identical to that of a hydrogen storing alloy electrode including no Cr. This is because Cr can prevent the other alloy compositions from eluting into the alkaline electrolytic solution. However, since Cr also has an effect to degrade the electrochemical activity in the early charging and discharging cycles, the early discharging characteristics are degraded as the content of Cr increases. But this effect of Cr is not much affected if w, the mole ratio of Cr to Zr, is in the range of 0.02 to 0.08.

TABLE 12

| Sample No. | Composition |
| --- | --- |
| 57 | $ZrMn_{0.6}V_{0.2}Co_{0.1}Ni_{1.2}$ |
| 133 | $ZrMn_{0.6}V_{0.2}Co_{0.1}Cr_{0.02}Ni_{1.2}$ |
| 134 | $ZrMn_{0.6}V_{0.2}Co_{0.1}Cr_{0.04}Ni_{1.2}$ |
| 135 | $ZrMn_{0.6}V_{0.2}Co_{0.1}Cr_{0.06}Ni_{1.2}$ |
| 136 | $ZrMn_{0.6}V_{0.2}Co_{0.1}Cr_{0.08}Ni_{1.2}$ |
| 137 | $ZrMn_{0.6}V_{0.2}Co_{0.1}Cr_{0.1}Ni_{1.2}$ |
| 138 | $ZrMn_{0.6}V_{0.2}Co_{0.1}Cr_{0.12}Ni_{1.2}$ |

(Example 13)

Sample alloys respectively having different compositions as listed in Table 13 were produced in the same manner as in Example 1 except that Cr was used instead of Al, and Fe or Co was further used as the starting materials. In all the samples, w, the mole ratio of Cr to Zr, was 0.04. In the production of samples having an m, the mole ratio of Mn to Zr, of 0.8 or more, an induction heater was used instead of the arc melting furnace as in Example 2.

Samples 145 to 157 are examples of the hydrogen storing alloy used in the present invention and Samples 139 to 144 are reference examples.

1. Evaluation of Physicochemical Characteristics of Hydrogen Storing Alloy

The results of the X-ray powder diffraction proved that the phases of each alloy sample were mainly C15-type Laves phases having a crystal structure of $MgCu_2$ type fcc. The X-ray diffraction was also performed before the heat treatment. As a result, it was found that the peaks representing fcc structures (C15-type Laves phases) were higher and more acute in the heat-treated alloys than in those subjected to no heat treatment. This indicates that the heat treatment increased the proportion of the C15-type Laves phases to the entire part of each alloy and accordingly improved the homogeneity and crystallinity thereof. Especially, even samples having an m, the mole ratio of Mn to Zr, of 0.8 or more had homogeneous compositions. The crystal lattice constants were within the range of 7.03 to 7.10 angstroms in all the obtained samples except for Sample 140, which had a crystal lattice constant of smaller than 7.03 angstroms.

Next, in the measurement of the PCT characteristics at 70° C., all the samples had almost the same hydrogenation characteristics except that Samples 140 and 142 exhibited a high hydrogen equilibrium pressure, and Samples 141 and 143 had a short plateau region in the PCT diagram. The other samples had a hydrogen absorbing capacity of 1.0 to 1.2 (H/M), which was about 10% to 20% larger than that of Sample 140, 141, 143 or 144. Moreover, a heat treatment in vacuum made the plateau region in the PCT diagram longer, resulting in increasing the amount of hydrogen to be absorbed by the alloy. This also applied to alloys including no Cr, which proved that the hydrogenation characteristics of an alloy including Cr in the mole ratio to Zr of 0.04 were almost equal to those of an alloy including no Cr.

2. A Half Cell Test

Figure 29:
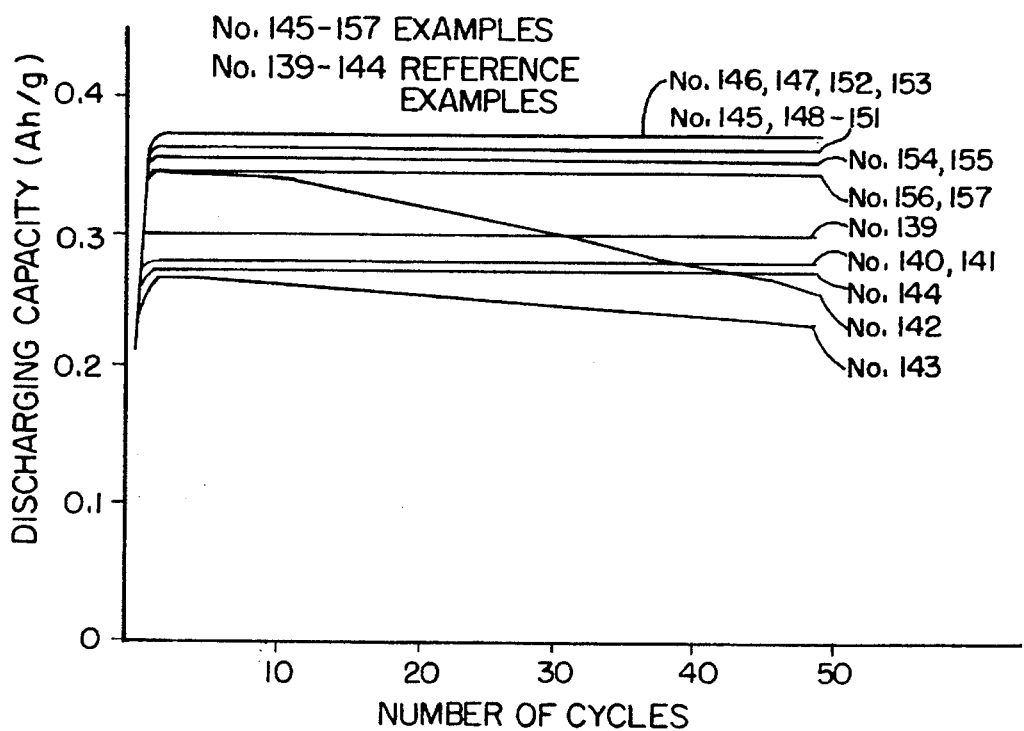
FIG. 29 shows the test results for a half cell produced by using a hydrogen storing alloy produced in Example 13 of the present invention.

A half cell test was performed on each of the above-mentioned alloy samples in the same manner as in Example 1. The results are shown in FIG. 29.

The early discharging characteristics were excellent in all the half cells, and addition of Cr did not degrade the electrochemical activity in the early charging and discharging cycles. However, the cells using Samples 140, 141, 143 and 144, which had a small hydrogen absorbing capacity, had a small saturation discharging capacity. The cell using Sample 139, which had only a small amount of Ni, was low in electrochemical activity, and had a small discharging capacity in the early cycles and a small saturation discharging capacity. In the cell using Sample 142, which had a comparatively large amount of Mn, a large amount of Mn was eluted into the alkaline electrolytic solution, thereby decreasing the discharging capacity largely after a number of charging and discharging cycles. On the contrary, the cells using Samples 145 to 157, which are the hydrogen storing alloy electrodes according to the present invention, exhibited little decrease in saturation discharging capacity although they included Cr. Moreover, these cells had a large saturation discharging capacity of 0.34 to 0.37 Ah/g.

3. Shelf Life Test of Enclosed-type Nickel-Hydrogen Storage Batteries

Figure 30:
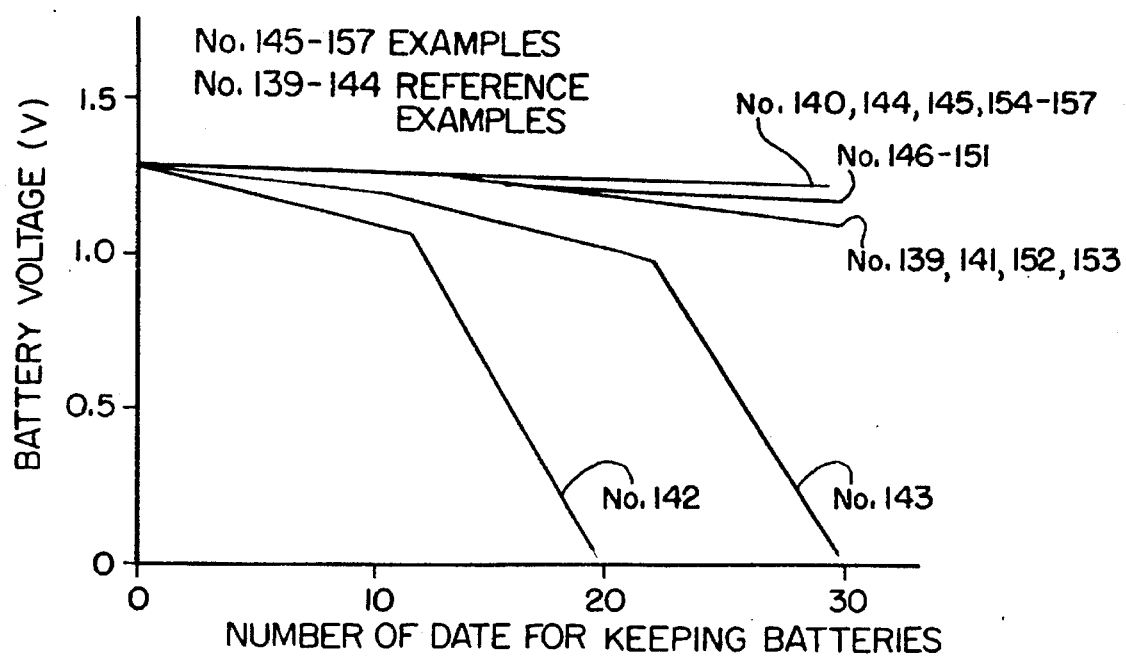
FIG. 30 shows the results for a shelf life test at 65° C. of a storage battery produced by using the hydrogen storing alloy produced in Example 13 of the present invention.

The above-mentioned samples were used to produce enclosed-type nickel-hydrogen storage batteries for the evaluation of the lifetime characteristics thereof at 65° C. as in Example 1. The results are shown in FIG. 30.

In the batteries using Samples 142 and 143, the battery voltages were rapidly decreased after they were kept at 65° C. for about 10 to 20 days. This seems to be for the following reason: In Sample 142, since the constant of Mn is large, Cr can not prevent alloy components from eluting into the alkaline electrolytic solution; in Sample 143, since the content of V is large, Cr can not prevent alloy components from eluting into the alkaline electrolytic solution; The other batteries exhibited little decrease in battery voltages even after they were kept for 30 days.

The results of the half cell test and the shelf life test at 65° C. show the following: In the batteries using the sample except for Samples 142 and 143, Cr provided a long life at a high temperature. But only the hydrogen storing alloy electrodes according to the present invention had a larger discharging capacity, and were excellent in the early discharging characteristics.

Moreover, the similar half cell test and shelf life test at 65° C. were performed using alloys including Cr in the mole ratio to Zr of 0.02, 0.04 and 0.08 to obtain similar results.

TABLE 13

| Sample No. | Composition |
| --- | --- |
| 139 | $ZrMn_{0.7}V_{0.3}Co_{0.2}Cr_{0.04}Ni_{0.9}$ |
| 140 | $ZrMn_{0.4}V_{0.1}Fe_{0.1}Cr_{0.04}Ni_{1.6}$ |
| 141 | $ZrMn_{0.3}V_{0.3}Co_{0.1}Cr_{0.04}Ni_{1.4}$ |
| 142 | $ZrMn_{0.9}V_{0.2}Fe_{0.1}Cr_{0.04}Ni_{1.0}$ |
| 143 | $ZrMn_{0.5}V_{0.4}Co_{0.1}Cr_{0.04}Ni_{1.2}$ |
| 144 | $ZrMn_{0.6}V_{0.2}Fe_{0.3}Cr_{0.04}Ni_{1.1}$ |
| 145 | $ZrMn_{0.6}V_{0.2}Fe_{0.1}Cr_{0.04}Ni_{1.2}$ |
| 146 | $ZrMn_{0.7}V_{0.2}Co_{0.1}Cr_{0.04}Ni_{1.1}$ |
| 147 | $ZrMn_{0.7}V_{0.2}Fe_{0.1}Cr_{0.04}Ni_{1.1}$ |
| 148 | $ZrMn_{0.7}V_{0.2}Co_{0.2}Cr_{0.04}Ni_{1.1}$ |
| 149 | $ZrMn_{0.7}V_{0.2}Fe_{0.2}Cr_{0.04}Ni_{1.1}$ |
| 150 | $ZrMn_{0.8}V_{0.2}Co_{0.1}Cr_{0.04}Ni_{1.1}$ |
| 151 | $ZrMn_{0.8}V_{0.2}Fe_{0.1}Cr_{0.04}Ni_{1.1}$ |
| 152 | $ZrMn_{0.7}V_{0.3}Co_{0.1}Cr_{0.04}Ni_{1.1}$ |
| 153 | $ZrMn_{0.7}V_{0.3}Fe_{0.1}Cr_{0.04}Ni_{1.1}$ |
| 154 | $ZrMn_{0.5}V_{0.2}Co_{0.1}Cr_{0.04}Ni_{1.2}$ |

TABLE 13-continued

| Sample No. | Composition |
|---|---|
| 155 | $ZrMn_{0.5}V_{0.2}Fe_{0.1}Cr_{0.04}Ni_{1.2}$ |
| 156 | $ZrMn_{0.4}V_{0.2}Co_{0.2}Cr_{0.04}Ni_{1.3}$ |
| 157 | $ZrMn_{0.4}V_{0.2}Fe_{0.2}Cr_{0.04}Ni_{1.3}$ |

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A hydrogen storing alloy electrode comprising a hydrogen storing alloy represented by the general formula $ZrMn_mV_xZ_tX_uNi_z$ or a hydride thereof, the hydrogen storing alloy having C15-type Laves phases with a crystal structure of $MgCu_2$ type face center cubix, and a crystal lattice constant thereof being 7.03 angstroms or more and 7.10 angstroms or less, wherein X is Al, Zn or W; Z is at least one element selected from the group consisting of Fe, Co and Cr; m, x, t, u and z are respectively the mole ratios of Mn, V, Z, X and Ni to Zr; $0.4 \leq m \leq 0.8$, $1.0 \leq x \leq 0.3$, $0.1 \leq t \leq 0.2$, $1.0 \leq z \leq 1.5$, $2.0 \leq m+x+t+u+z \leq 2.4$; when X is Al, $0 < u \leq 0.2$; when X is W, $0 < u \leq 0.1$; and when X is Zn, $0.02 \leq u \leq 0.18$, and wherein the hydrogen storing alloy is heat-treated at a temperature of 900° to 1300° C. in a vacuum or in an inert-gaseous atmosphere.

2. The hydrogen storing alloy electrode according to claim 1, wherein the mole ratio z of Ni to Zr is $1.1 \leq z \leq 1.4$.

3. A hydrogen storing alloy electrode comprising a hydrogen storing alloy represented by the general formula $ZrMn_mV_xM_rCr_wNi_z$ or a hydride thereof, the hydrogen storing alloy having C15-type Laves phases with a crystal structure of $MgCu_2$ type face center cubix, and a crystal lattice constant thereof being 7.03 angstroms or more and 7.10 angstroms or less, wherein M is at least one element selected from the group consisting of Fe and Co; m, x, r, w and z are respectively the mole ratios of Mn, V, M, Cr and Ni to Zr; $0.4 \leq m \leq 0.8$, $0.1 \leq x \leq 0.3$, $0.1 \leq r \leq 0.2$, $0.02 \leq w \leq 0.08$, $1.0 \leq z \leq 1.5$ and $2.0 \leq m+x+r+w+z \leq 2.4$, and wherein the hydrogen storing alloy is heat-treated at a temperature of 900° to 1300° C. in a vacuum or in an inert-gaseous atmosphere.

4. The hydrogen storing alloy electrode according to claim 3, wherein the mole ratio z of Ni to Zr is $1.1 \leq z \leq 1.4$.

* * * * *